United States Patent
He et al.

(10) Patent No.: US 10,164,672 B2
(45) Date of Patent: Dec. 25, 2018

(54) SELECTION OF ACKNOWLEDGMENT TIMING IN WIRELESS COMMUNICATIONS

(71) Applicants: Hong He, Beijing (CN); Seunghee Han, Cupertino, CA (US); Jong-Kae Fwu, Sunnyvale, CA (US); Debdeep Chatterjee, Mountain View, CA (US); Rui Huang, Beijing (CN)

(72) Inventors: Hong He, Beijing (CN); Seunghee Han, Cupertino, CA (US); Jong-Kae Fwu, Sunnyvale, CA (US); Debdeep Chatterjee, Mountain View, CA (US); Rui Huang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/440,860

(22) PCT Filed: Dec. 3, 2013

(86) PCT No.: PCT/US2013/072908
§ 371 (c)(1),
(2) Date: May 5, 2015

(87) PCT Pub. No.: WO2014/089107
PCT Pub. Date: Jun. 12, 2014

(65) Prior Publication Data
US 2015/0304087 A1 Oct. 22, 2015

Related U.S. Application Data

(60) Provisional application No. 61/732,851, filed on Dec. 3, 2012.

(51) Int. Cl.
*H04B 1/12* (2006.01)
*H04W 72/12* (2009.01)
(Continued)

(52) U.S. Cl.
CPC ............. *H04B 1/12* (2013.01); *H04B 1/3827* (2013.01); *H04B 7/0452* (2013.01);
(Continued)

(58) Field of Classification Search
USPC .......................................................... 370/280
See application file for complete search history.

(56) References Cited

U.S. PATENT DOCUMENTS 8,811,332 B2 * 8/2014 Yin ........................ H04W 72/12
370/330
2012/0106404 A1 5/2012 Damnjanovic
(Continued)

FOREIGN PATENT DOCUMENTS

CN 101562511 A 10/2009
EP 2079181 A1 7/2009
(Continued)

OTHER PUBLICATIONS

Intel Corporation; "DL Scheduling/HARQ timing issue for inter-band TDD CA"; 3GPP TSG R1-122657; (May 21-25, 2012); 5 pages; RAN WG1 #69, Prague, Czech Republic; (Agenda 7.2.1.5).
(Continued)

*Primary Examiner* — Gregory B Sefcheck
*Assistant Examiner* — Majid Esmaeilian
(74) *Attorney, Agent, or Firm* — Thorpe North & Western

(57) ABSTRACT

Disclosed is a User Equipment device configured to select a suitable acknowledgement timing configuration in a time division duplex-frequency division duplex (TDD-FDD) carrier aggregation (CA) enabled wireless network, comprising establishing, by a user equipment (UE), a connection to a primary serving cell (PCell) and a secondary serving cell (SCell) of a base station, the PCell having a first TDD or first FDD configuration, the SCell having a second FDD or second TDD configuration, receiving, by the UE, downlink
(Continued)

data through the PCell and SCell, categorizing a type of downlink data subframe in use by the SCell, selecting, by the UE, a hybrid automatic repeat request (HARQ) timing configuration based on the type of downlink data subframe for use by the SCell, and transmitting acknowledgement information associated with the downlink data according to the selected hybrid automatic repeat request (HARQ) timing configuration on PCell. Other embodiments may be described and claimed.

18 Claims, 10 Drawing Sheets

(51) Int. Cl.
| | | |
|---|---|---|
| H04B 1/3827 | (2015.01) | |
| H04W 84/18 | (2009.01) | |
| H04W 92/18 | (2009.01) | |
| H04W 72/04 | (2009.01) | |
| H04L 25/03 | (2006.01) | |
| H04W 76/14 | (2018.01) | |
| H04W 76/27 | (2018.01) | |
| H04W 76/28 | (2018.01) | |
| H04L 5/00 | (2006.01) | |
| H04W 36/10 | (2009.01) | |
| H04W 52/40 | (2009.01) | |
| H04J 11/00 | (2006.01) | |
| H04W 72/08 | (2009.01) | |
| H04W 52/02 | (2009.01) | |
| H04L 1/00 | (2006.01) | |
| H04W 24/02 | (2009.01) | |
| H04L 25/02 | (2006.01) | |
| H04B 7/0452 | (2017.01) | |
| H04B 7/06 | (2006.01) | |
| H04B 7/155 | (2006.01) | |
| H04L 1/18 | (2006.01) | |
| H04W 24/10 | (2009.01) | |
| H04B 17/24 | (2015.01) | |
| H04B 17/26 | (2015.01) | |
| H04B 17/345 | (2015.01) | |
| H04W 40/16 | (2009.01) | |
| H04W 84/04 | (2009.01) | |
| H04L 27/00 | (2006.01) | |

(52) U.S. Cl.
CPC ....... *H04B 7/0617* (2013.01); *H04B 7/15557* (2013.01); *H04B 17/24* (2015.01); *H04B 17/26* (2015.01); *H04B 17/345* (2015.01); *H04J 11/005* (2013.01); *H04J 11/0053* (2013.01); *H04L 1/0003* (2013.01); *H04L 1/0054* (2013.01); *H04L 1/1854* (2013.01); *H04L 1/1867* (2013.01); *H04L 5/0007* (2013.01); *H04L 5/0048* (2013.01); *H04L 5/0053* (2013.01); *H04L 5/0055* (2013.01); *H04L 5/0057* (2013.01); *H04L 5/0058* (2013.01); *H04L 5/0092* (2013.01); *H04L 25/0202* (2013.01); *H04L 25/0206* (2013.01); *H04L 25/03305* (2013.01); *H04W 24/02* (2013.01); *H04W 24/10* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/14* (2018.02); *H04W 76/27* (2018.02); *H04W 76/28* (2018.02); *H04W 84/18* (2013.01); *H04W 92/18* (2013.01); *H04L 27/0008* (2013.01); *H04W 40/16* (2013.01); *H04W 72/1205* (2013.01); *H04W 84/042* (2013.01); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/24* (2018.01)

(56) References Cited

U.S. PATENT DOCUMENTS

| | | | |
|---|---|---|---|
| 2012/0257552 A1 | 10/2012 | Chen et al. | |
| 2012/0327821 A1* | 12/2012 | Lin | H04W 72/048 370/280 |
| 2013/0242816 A1* | 9/2013 | He | H04W 72/0413 370/280 |
| 2013/0308550 A1* | 11/2013 | Yin | H04L 5/001 370/329 |
| 2013/0336160 A1* | 12/2013 | Yin | H04L 1/1854 370/254 |
| 2014/0078941 A1* | 3/2014 | Seo | H04L 1/1822 370/280 |
| 2014/0078981 A1* | 3/2014 | Larsson | H04L 1/1607 370/329 |
| 2014/0092785 A1* | 4/2014 | Song | H04L 1/00 370/280 |
| 2014/0192688 A1 | 7/2014 | Yang et al. | |
| 2014/0376421 A1 | 12/2014 | Yang et al. | |
| 2015/0103705 A1 | 4/2015 | Yang et al. | |

FOREIGN PATENT DOCUMENTS

| | | |
|---|---|---|
| EP | 2 493 257 A1 | 8/2012 |
| EP | 2688237 A2 | 1/2014 |
| WO | WO 2011/068589 A2 | 6/2011 |
| WO | WO 2011/157234 A1 | 12/2011 |
| WO | WO 2012124980 A2 | 9/2012 |

OTHER PUBLICATIONS

Intel Corporation; "HARQ timing design for TDD Inter-band Carrier Aggregation"; 3GPP TSG R1-121530; (Mar. 26-30, 2012); 4 pages; RAN WG1 #68bis, Jeju, Korea; (Agenda 7.2.1.5).
Nokia Siemens Networks et al.; "Half duplex operation with interband CA with different TDD configurations on different bands"; 3GPP TSG R1-124997; (Nov. 12-16, 2012); 3 pages; RAN WG1 Meeting #71, New Orleans, US; (Agenda 6.2.1.1).
SAMSUNG; "Discussion on HARQ-ACK transmission for format 1b with channel selection"; 3GPP TSG R1-123455; (Aug. 13-17, 2012); 4 pages; RAN WG1 #70, Qingdao, China; (Agenda 7.2.3).
Samsung; "PDSCH HARQ timing"; 3GPP TSG R1-121612; (Mar. 26-30, 2012); 4 pages; RAN WG1 #68bis, Jeju, Korea; (Agenda 7.2.1.5).
Samsung; "UL HARQ-ACK transmission for multiple PDSCHs in TDD CA"; 3GPP TSG R1-121611; (Mar. 26-30, 2012); 2 pages; RAN WG1 #68, Jeju, Korea; (Agenda 7.2.1.5).
ZTE; "HARQ timing of PDSCH on cross-carrier scheduled SCell for TDD CA with different UL-DL configurations"; 3GPP TSG R1-123388; (Aug. 13-17, 2012); 6 pages; RAN WG1 Meeting #70, Qingdao, China; (Agenda 7.2.3).
Extended European search report dated Jun. 21, 2016, in EP Application No. 13860933.4, filed Mar. 12, 2013, 4 pages.

* cited by examiner

SELECTION OF ACKNOWLEDGMENT TIMING IN WIRELESS COMMUNICATIONS

CROSS REFERENCE TO RELATED APPLICATIONS

This application is a 371 U.S. Nationalization of Patent Cooperation Treaty Application PCT/US2013/072908, filed Dec. 3, 2013, which claims the benefit of U.S. Provisional Patent Application No. 61/732,851, filed Dec. 3, 2012, each of which are incorporated herein in their entirety.

FIELD

Embodiments described herein relate generally to the field of communications, and more particularly, to selection of acknowledgement timing in wireless communication networks.

BACKGROUND INFORMATION

A time division duplex (TDD) system, in wireless communications, may offer flexibility in resource utilization. For example, a TDD system may use different TDD configurations to match uplink and downlink traffic characteristics of a wireless communications cell. The flexibility of using different TDD configurations may permit the ratio between available uplink (UL) and downlink (DL) resources to range from 3UL:2DL to 1UL:9DL. A frequency division duplex (FDD) system, in wireless communications, may also offer flexibility in resource utilization.

Release 10, of $3^{rd}$ Generation Partnership Project's (3GPP) long term evolution-advanced (LTE-A) communications standard, may limit support of the aggregation of TDD Component Carriers (CCs) to the same uplink/downlink (UL/DL) TDD configurations. While such limitations may have simplified the design and operation within the standard, such limitation may have limited potential for greater data throughput.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF THE EMBODIMENTS

Illustrative embodiments of the present disclosure include, but are not limited to, methods, systems, and apparatuses for selection of acknowledgement signal timing in a wireless communication network.

Various aspects of the illustrative embodiments will be described using terms commonly employed by those skilled in the art to convey the substance of their work to others skilled in the art. However, it will be apparent to those skilled in the art that some alternate embodiments may be practiced using one or more selected portions of the described embodiments. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations may be described as multiple discrete operations, in turn, in a manner that is most helpful in understanding the illustrative embodiments; however, the specific order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

Figure 1:
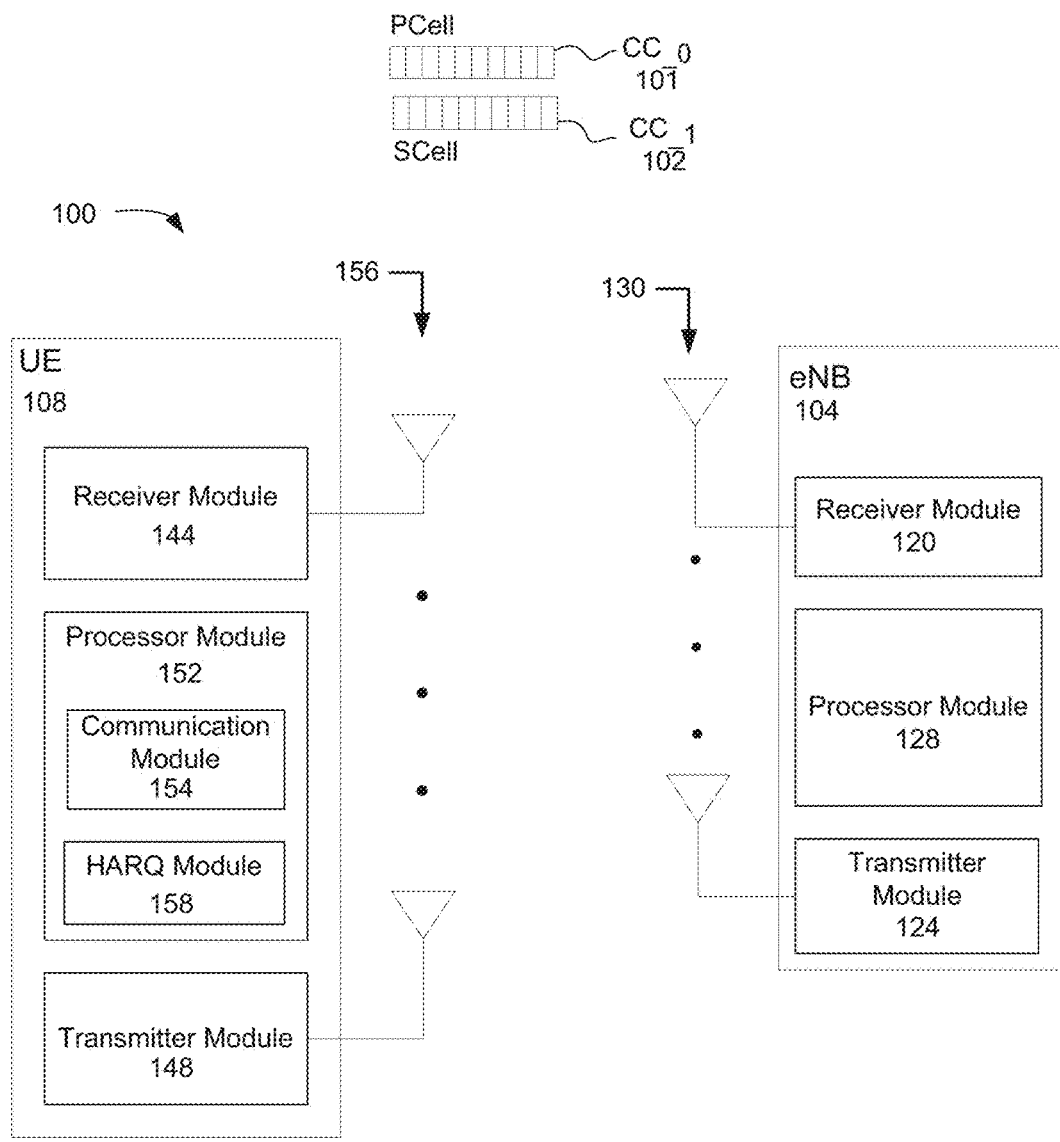
FIG. 1 schematically illustrates a wireless communication network in accordance with various embodiments.

FIG. 1 schematically illustrates a wireless communication network 100 in accordance with various embodiments. Wireless communication network 100 may be an access network of a 3rd Generation Partnership Project (3GPP)

long-term evolution (LTE) or long-term evolution-advanced (LTE-A) network such as an evolved universal mobile telecommunication system (UMTS) terrestrial radio access network (E-UTRAN). The wireless communication network 100 may include a base station, e.g., an enhanced node base station (eNB) 104, configured to wirelessly communicate with a mobile device or terminal, e.g., user equipment (UE) 108. While embodiments of the present invention are described with reference to an LTE communication network, some embodiments may be used with other types of wireless communication/access network(s).

eNB 104 may include a receiver module 120 with which to receive signals from UE 108 via one or more antennas 130. eNB 104 may include a transmitter module 124 with which to transmit signals to UE 108 via one or more antennas 130. eNB 104 may also include a processor module 128 coupled between receiver module 120 and transmitter module 124 and configured to encode and decode information communicated by the signals.

In embodiments in which the UE 108 is capable of utilizing carrier aggregation (CA), a number of component carriers (CCs) may be aggregated for communication between the eNB 104 and the UE 108. In an initial connection establishment, the UE 108 may connect with a primary serving cell (PCell) of the eNB 104 utilizing a primary CC. This connection may be used for various functions such as security, mobility, configuration, etc. Subsequently, the UE 108 may connect with one or more secondary serving cells (SCells) of the eNB 104 utilizing one or more secondary CCs. These connections may be used to provide additional radio resources.

Each CC may support a number of communication channels according to a release of the 3GPP LTE-advanced communication standard. For example, each CC may support a physical downlink shared channel (PDSCH) for transmission of downlink data. As another example, each CC may support physical uplink control channel (PUCCH) or/and physical uplink shared channel (PUSCH) to carry information between UE 108 and eNB 104. A CC may include a plurality of uplink and downlink subframes for carrying information between eNB 104 and UE 108. A single 10 ms radio frame may include ten subframes.

The CCs may be configured to transport information according to a time domain duplexing (TDD) communication protocol or a frequency domain duplexing (FDD) communication protocol. Each CC may be scheduled to transport data to UE 108 or transport data to eNB 104 according to one of several TDD configurations or FDD configurations. For example, with reference to Table 1, when a TDD communications protocol is in use, each CC may be assigned to transport data and/or control signals according to one of TDD configurations 0-6.

TABLE 1

TDD Uplink-Downlink Configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A primary CC and secondary CC may both be configured with the same TDD configuration, or with different TDD configurations. In general, each of subframes 0-9 shown in Table 1 that is labeled with a "D" or an "S" is a subframe with which UE 108 receives data from eNB 104, and each of subframes 0-9 that is labeled with a "U" is a subframe through which UE 108 transmits data to eNB 104. For FDD systems, downlink and uplink transmissions may take place in different frequency bands, which may be paired frequency bands.

eNB 104 may be configured to communicate some information solely by the PCell and may be configured to communicate other information by either the PCell or the SCell. For example, eNB 104 may be configured to receive acknowledgment signals from UE 108 solely through the PCell. According to various embodiments, the acknowledgment signals may be hybrid adaptive repeat and request (HARQ) signals corresponding to a positive acknowledgment (ACK) of receipt of data and a negative acknowledgment (NACK) of receipt of data. In embodiments, UE 108 may be configured to transmit ACK/NACK signals to notify eNB 104 that transmitted data has or has not been received.

UE 108 may be configured to determine a schedule with which to transmit ACK/NACK signals to eNB 104. UE 108 may include a receiver module 144, a transmitter module 148, a processor module 152, and one or more suitable antennas 156. Receiver module 144 and transmitter module 148 may be coupled to one or more suitable antennas 156 to transmit and receive wireless signals to/from eNB 104.

Processor module 152 may be coupled to receiver module 144 and transmitter module 148 and be configured to decode and encode information transmitted in signals communicated between the UE 108 and the eNB 104. Processor module may include a communication module 154 and an HARQ module 158. Processor module 152 may be configured to use communication module 154 to transmit information in uplink subframes of the PCell, e.g., on CC_0 101, according to the scheduling of a first TDD configuration at a first frequency, or first FDD configuration. Processor module 152 may also be configured to transmit information in uplink subframes of the SCell, e.g., on CC_1 102, according to a second TDD configuration at a second frequency that is different from the first frequency, or a second FDD configuration. According to one embodiment, the difference between transmission frequencies of CC_0 101 and CC_1 102 may range from hundreds of kilohertz to tens of Gigahertz, in accordance with inter-band or intra-band schemes for TDD-FDD carrier aggregation.

As will be described in more detail hereafter, processor module 152 may be configured to selectively transmit ACK/NACK information for SCell communications via a schedule of a TDD UL/DL configuration that is different than the TDD UL/DL configuration indicated in a system information block 1 (SIB1) or FDD configuration of the SCell. In various embodiments, processor module 152 may use HARQ module 158 to select a HARQ timing sequence configuration or timing schedule based on one of the existing seven TDD UL/DL configurations (e.g. of Table 1) or a FDD configuration. HARQ module 158 may also generate the ACK/NACK information for processor module 152. The HARQ module may be coupled to the communication module 154 and may be configured to use the communication module 154 to transmit the generated ACK/NACK information via the selected HARQ timing sequence.

Various embodiments of the present disclosure may enable an eNB to schedule uplink and downlink data transmission(s) with different TDD UL/DL configuration(s) or FDD configuration(s), including TDD-FDD CA configuration(s), on component carriers. These features may advantageously enable a communication system to transmit data information with higher peak data rates than previous communication systems. Also, otherwise, some information transmitted with a PCell and an SCell having different TDD UL/DL configurations or FDD configurations may result in HARQ ACK/NACK resources conflicts.

The various embodiments disclosed herein are described in a TDD-FDD carrier aggregation context, and may be applicable to embodiments in which the UE 108 and eNB 104 utilize two or more serving cells, with respective component carriers, for communications. In these disclosed embodiments, the UE 108 may be configured to communicate data with the eNB 104 on the PCell according to a first TDD UL/DL configuration, for example as indicated in the system information block 1 (SIB1). The UE 108 may be further configured to transmit ACK/NACK information via a HARQ timing sequence of a second TDD UL/DL configuration for the HARQ-ACK associated with data transmitted on the SCell. For example, the SCell may actually be deployed with a TDD UL/DL configuration or a FDD configuration system. The UE 108 may be one of a plurality of UEs configured to communicate with the eNB 104 (or multiple eNBs). These and other embodiments will be described in further detail below.

Figure 2:
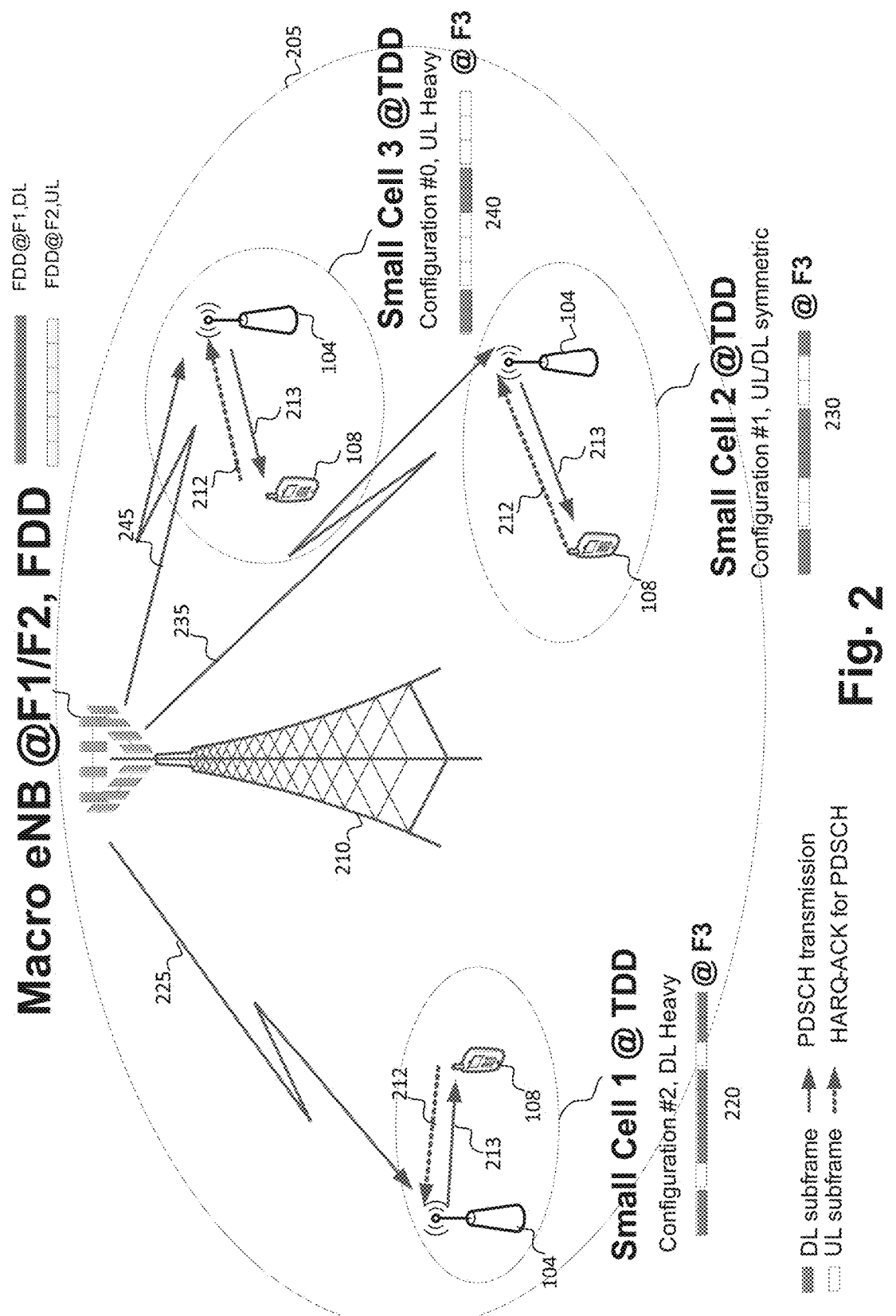
FIG. 2 schematically illustrates an example implementation of a wireless communication network in accordance with various embodiments.

FIG. 2 schematically illustrates an example implementation of a wireless communication network in accordance with various embodiments, where TDD-FDD carrier aggregation (CA) has been utilized. In the wireless communication network shown in FIG. 2, there is shown a macro cell 205 deployed through macro eNB 210, which may be operating as a FDD configured system with one paired spectrum, e.g., F1 for downlink and F2 for uplink respectively. Under the coverage of the macro cell 205 layer, multiple small cells may operate—for example small cell 1 220, small cell 2 230 and small cell 3 240. Each small cell 220-240 is shown in FIG. 2 as comprising an eNB 104 in communication with a UE (e.g. mobile device) 108, over an uplink 212 and downlink 213, respectively. The eNBs 104 of each small cell 220-240 may be communicatively coupled to the macro eNB 210 over a respective wireless communication link, e.g. wireless communication links 225, 235 and 245 or over an optical fiber link (not shown). However, any number or form of eNB 104 and/or UE 108, and wireless communication links (e.g. 225-245) may be implemented in various embodiments.

In the example shown in FIG. 2, each small cell 220-240 may operate with a TDD configured system on the same carrier frequency, e.g., F3, simultaneously. If the macro serving cell 205 operating with a FDD system, e.g., serving cell 205 with F1/F2, is configured as the primary serving cell (PCell), a PDSCH HARQ timing sequence (as specified in a previous release—such as, but not limited to, Rel. 10 onwards of the 3GPP LTE-A standard) defined for the FDD system may be directly reused for each small serving cell 220-230 that is configured with a TDD system. Meanwhile, to support TDD-FDD CA with a (e.g. small) serving cell operating with TDD system as PCell, for example F3 in FIG. 2, a key element would be how to define the timing relation between a PDSCH transmission in a certain DL subframe and the UL transmission in which the corresponding ACK/NACK is transmitted to eNB 104.

Various embodiments described herein provide methods, systems and apparatus for selecting a suitable acknowledgement timing configuration(s) in wireless communication network, for example a time division duplex-frequency division duplex (TDD-FDD) carrier aggregation (CA) enabled wireless communication network. Such embodiments may, for example, provide a means to define an adaptive HARQ timing determination for LTE TDD-FDD CA support, in, for example, Rel-12 (or later) of the 3GPP LTE-A standard, and may include adaptive determination of a timing relation between a PDSCH transmission in a certain DL subframe and the UL transmission in which the corresponding ACK/NACK is transmitted.

Figure 4:
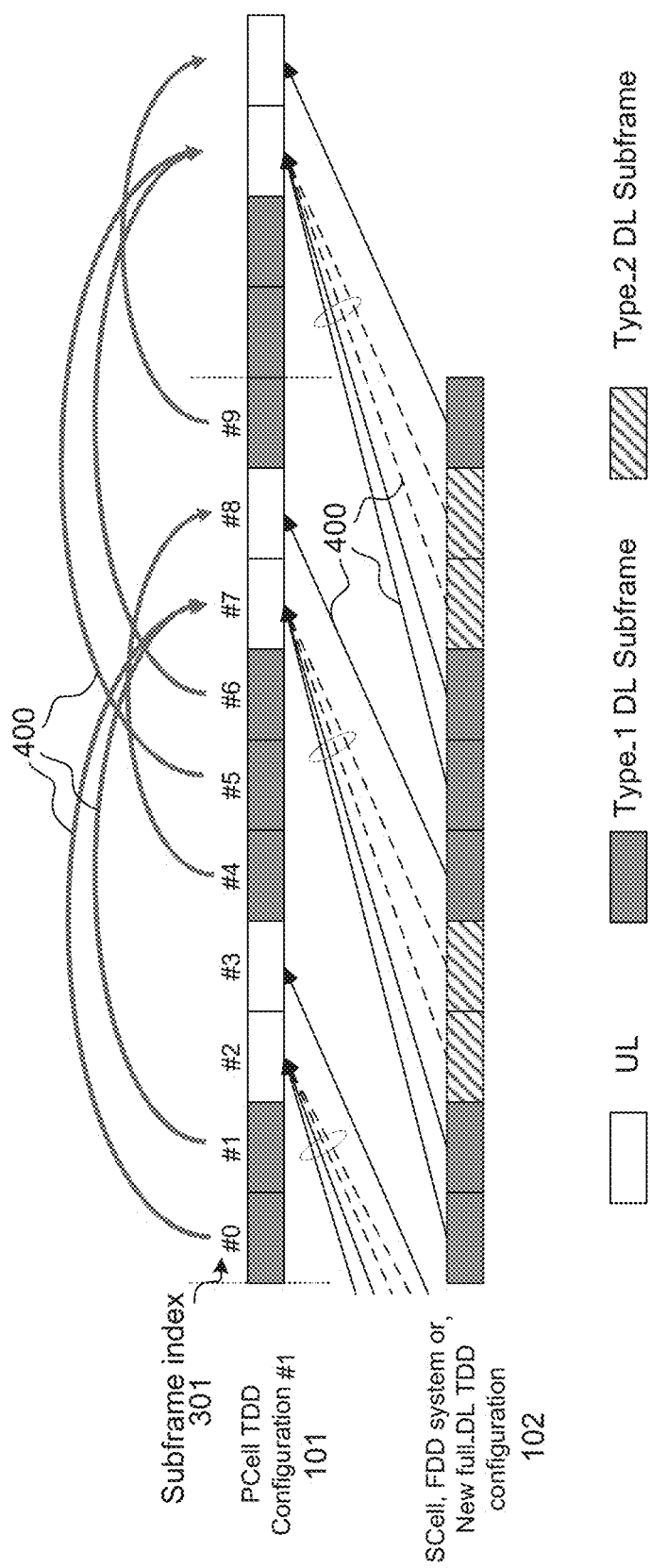
FIG. 4 schematically illustrates a HARQ timing relationship between a PCell and SCell in accordance with a first embodiment.
Figure 5:
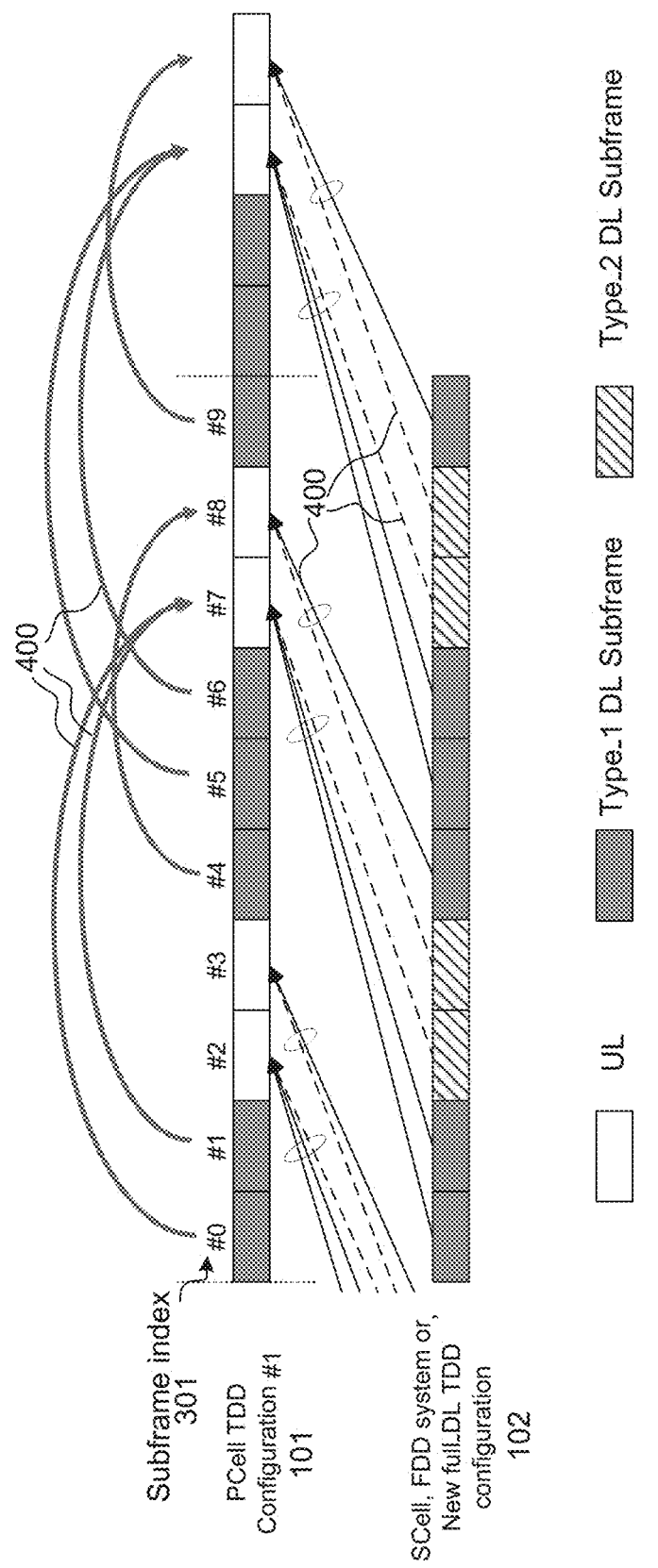
FIG. 5 schematically illustrates a HARQ timing relationship between a PCell and SCell in accordance with a second embodiment.
Figure 6:
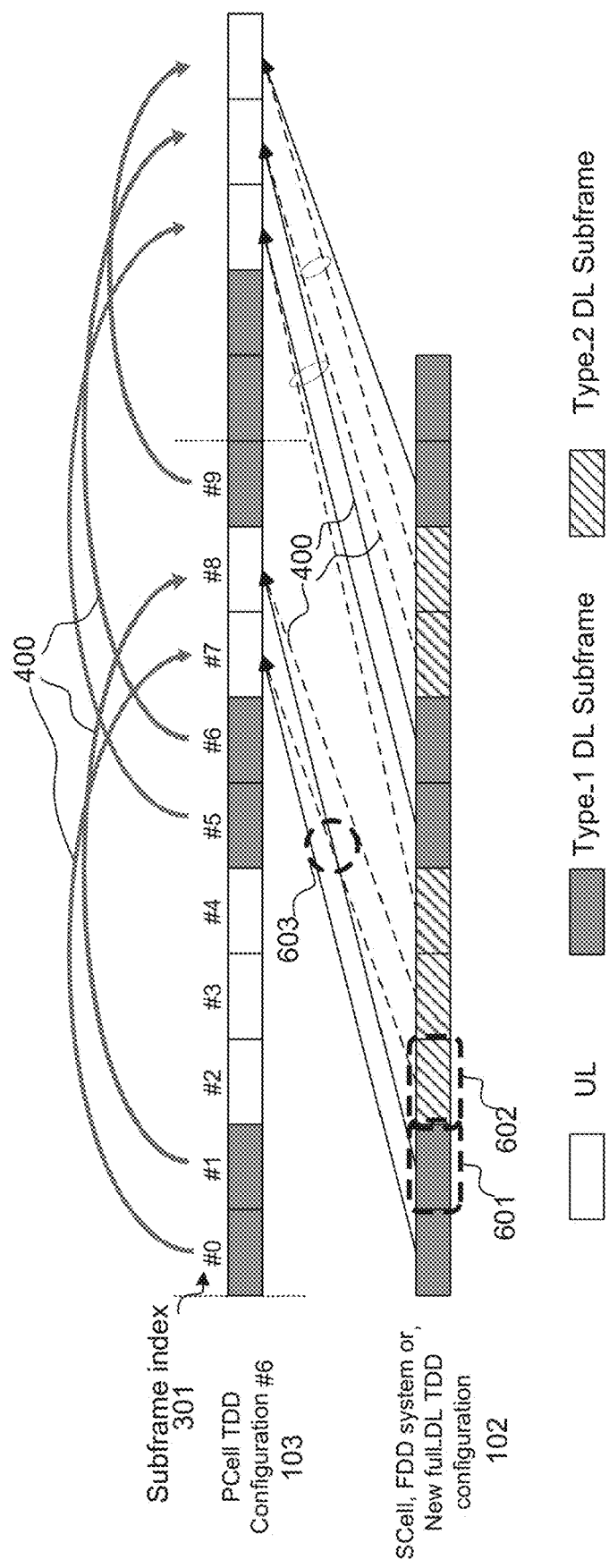
FIG. 6 schematically illustrates a HARQ timing relationship between a PCell and SCell in accordance with a third embodiment.

FIGS. 4 to 6 all illustrate exemplary HARQ ACK/NACK signal scheduling (i.e. HARQ-ACK timing sequence) that may be performed by processor module 152 or other suitably configured hardware, according to different embodiments. They are not an exhaustive list of the different HARQ ACK/NACK signal scheduling schemes disclosed, but merely show a few different scenarios contemplated. The Tables 3-8 included herein may be considered to show a fuller set (e.g. the majority) of HARQ ACK/NACK signal scheduling scenarios according to the different embodiments described. Each of FIGS. 4 to 6 show a PCell configured with a noted TDD UL/DL configuration number (e.g. #1, #6, etc, as shown in Table 1), and a corresponding SCell configured with a FDD or TDD configuration. Each of lines 400 represent a link between a downlink data subframe or special data subframe and the corresponding uplink subframe that is to be designated to carry a corresponding ACK/NACK information/message from the UE 108 back to an eNB 104.

A first set of embodiments may comprise an apparatus, e.g. UE apparatus, (and a corresponding method) for selecting a suitable HARQ-ACK timing sequence in which a type-specific HARQ timing sequence relationship is followed for downlink data subframes (e.g. PDSCH subframes) on the serving cell deployed with FDD (or TDD) configuration wherein, in this example, all subframes may be downlink subframes on the FDD DL frequency band.

Figure 3:
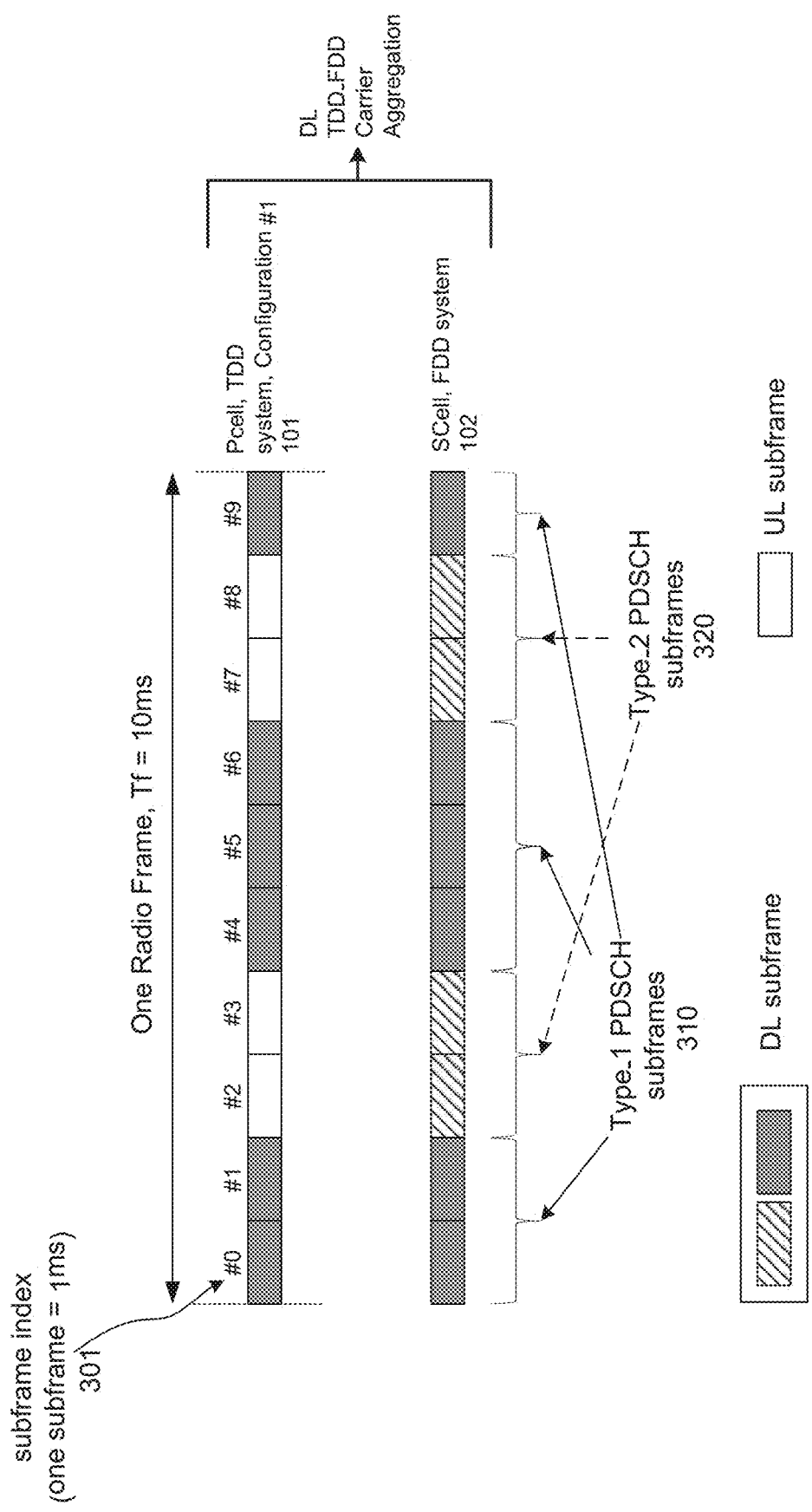
FIG. 3 schematically illustrates downlink subframe types for an SCell in accordance with various embodiments.

FIG. 3 schematically illustrates downlink subframe types for an SCell in accordance with various embodiments. In FIG. 3, a generic TDD-FDD CA model focusing on downlink CA is provided assuming the primary serving cell (PCell) is deployed with a TDD system, in configuration #1 (from table 1, above), and the secondary serving cell (SCell) is a FDD system with corresponding FDD configuration. The frame structure shown in FIG. 3 assumes that all subframes on SCell are available for downlink transmission. Although the SCell is shown as FDD, other embodiments may use an SCell configured with a TDD UL/DL configuration in which all subframes are DL subframes.

Two types of downlink subframes may be used on an SCell, namely Type-1 downlink subframes and Type-2 downlink subframes. These two types of downlink subframes are shown in FIG. 3, and may be defined, for example, depending on the corresponding type of subframe in use on a corresponding PCell. In FIG. 3, there is shown an example PCell radio frame 101, including 10 (e.g. #0-#9) subframes, indexed by subframe index 301, and a corresponding example SCell radio frame 102, also including 10 (e.g. #0-#9) subframes, indexed by the same subframe index 301. The PCell radio frame 101 and SCell radio frame 102 may be aggregated for use by one UE 108, using suitable carrier aggregation, to form a TDD-FDD CA (downlink, in the example shown in FIG. 3, but alternative embodiments may include an uplink TDD-FDD CA formation).

A Type-1 DL subframe 310 may be defined as a subframe that is DL on both the PCell and the SCell. Alternatively or additionally, a Type-1 DL subframe may be defined as a subframe that is DL on both the scheduling cell and the scheduled cell, for example, in a case of cross-carrier scheduling when more than one TDD serving cell(s) may be configured for use in the wireless communication network, and the scheduling cell configured is not the PCell. A Type-2 DL subframe 320 may be defined as a subframe that is DL only on the SCell in case of TDD-FDD CA as depicted in FIG. 3. Typically, all DL subframes on an SCell may be defined as one of these two types of DL subframes.

Therefore, in various embodiments, such as for the case of TDD-FDD CA schematically illustrated in FIG. 3, subframe #0, #1, #4, #5, #6 and #9 are Type-1 DL subframes, and subframe #2, #3, #7 and #8 are Type-2 DL subframes, according to the above-described definitions of DL subframe types.

In various embodiments, if a UE 108 is configured with more than one serving cell and if at least one serving cell is deployed with a TDD UL/DL configuration from a previous release of a 3GPP LTE standard (e.g., Rel-8/9/10/11), while the other serving cell is deployed with, for example, a full-DL TDD configuration or FDD configuration system, and if the serving cell deployed with a TDD UL/DL configuration from a previous release of a 3GPP LTE standard (e.g., Rel-8/9/10/11) is set as the PCell, then the PDSCH HARQ timing sequence configuration (i.e. relationships) for PCell and SCell may be defined respectively as below:

a) The HARQ timing sequence configuration of corresponding PCell downlink channel (e.g. PDSCH) may follow the PCell SIB1 UL/DL configuration.

b) For a corresponding SCell downlink channel (e.g. PDSCH) deployed with FDD or full-DL TDD configuration, in general, if there is a downlink channel (e.g. PDSCH) transmission indicated by the detection on a corresponding control channel (e.g. PDCCH) or there is detection of information on a corresponding control channel (e.g. PDCCH) indicating a downlink semi-persistent scheduling (SPS) release within subframe n-k, where k∈K and where K (as defined in, for example Table 3 to Table 5, below) is a set of M elements $\{k_0, k_1, \ldots k_{M-1}\}$ depending on the subframe n, the UL/DL timing sequence configuration on PCell and where the a principle (described below) is followed, the HARQ timing sequence principles listed below can be followed.

i) If an SCell downlink subframe of interest is a Type-1 DL subframe, the HARQ-ACK timing sequence may follow the PCell SIB1 TDD configuration regardless of cross-carrier scheduling or self-scheduling configuration, or alternatively follow the DL-reference UL/DL configuration, which is jointly determined by a scheduling cell SIB1 TDD configuration and PCell SIB1 configuration in case of cross-carrier scheduling as shown in Table 2:

TABLE 2

DL-reference UL/DL configuration for PDSCH HARQ-ACK on FDD DL SCell based on pair formed by (primary cell UL/DL configuration, scheduling cell UL/DL configuration).

| (Primary cell UL/DL configuration, scheduling cell UL/DL configuration) | DL-reference UL/DL configuration |
|---|---|
| (0, 0) | 0 |
| (1, 0), (1, 1), (1, 6), (0, 1), (6, 1) | 1 |
| (2, 0), (2, 2), (2, 1), (2, 6), (0, 2), (1, 2), (6, 2) | 2 |
| (3, 0), (3, 3), (3, 6), (0, 3), (6, 3) | 3 |
| (4, 0), (4, 1), (4, 3), (4, 4), (4, 6), (0, 4), (1, 4), (3, 4), (6, 4), (3, 1), (1, 3) | 4 |
| (5, 0), (5, 1), (5, 2), (5, 3), (5, 4), (5, 5), (5, 6), (0, 5), (1, 5), (2, 5), (3, 5), (4, 5), (6, 5), (3, 2), (4, 2), (2, 3), (2, 4) | 5 |
| (6, 0), (6, 6), (0, 6) | 6 |

TABLE 3

Downlink association set index K: $\{k_0, k_1, \ldots k_{M-1}\}$ for FDD on SCell.

| UL/DL Configuration on PCell | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, _5_ | _5_ | 4, _5_ | — | — | 6, _5_ | _5_ | 4, _5_ |
| 1 | — | — | 7, 6, _5_, _4_ | 4 | — | — | — | 7, 6, _5_, _4_ | 4 | — |
| 2 | — | — | 8, 7, 4, 6, _5_ | — | — | — | — | 8, 7, 4, 6, _5_ | — | — |
| 3 | — | — | 7, 6, 11, 10, _9_, _8_ | 6, 5 | 5, 4 | — | — | — | — | — |
| 4 | — | — | 12, 8, 7, 11, 10, _9_ | 6, 5, 4, 7 | — | — | — | — | — | — |
| 5 | — | — | 13, 12, 9, 8, 7, 5, 4, 11, 6, _10_ | — | — | — | — | — | — | — |
| 6 | — | — | 7, _5_, _4_ | 7 | 5 | — | — | 7, _5_, _4_ | 7, _4_ | — |

Note:
"x" is a HARQ-ACK timing sequence for Type-2 DL subframes and "y" (i.e. not underlined) is HARQ-ACK timing sequence for Type-1 DL subframes.

ii) If an SCell downlink subframe of interest is a Type-2 downlink subframe, a new HARQ-ACK timing sequence may be defined by following different alternatives (Alt.1 and Alt.2) described below:

Alt.1: HARQ-ACK for a downlink channel (e.g. PDSCH) transmission in subframe n-k, where k>=4, may be transmitted in the first available UL subframe n on the corresponding PCell. This may be preferable from a latency perspective. The exact HARQ-ACK timing sequence could be summarized in Table 3 corresponding to each of the existing seven TDD UL/DL configurations in use on the PCell, individually.

In one embodiment, as shown in FIG. 4, two carriers may be configured for the respective UE (i.e. the 'UE of interest' at any given point in the described embodiments), denoted as PCell and SCell. The PCell and SCell may be configured so that TDD configuration #1 (see Table 1) is deployed on the PCell, while a FDD configuration system may be used on the SCell.

Firstly, downlink subframes on the SCell may be categorized according to the Type-1 and Type-2 downlink channel (e.g. PDSCH) subframe definitions noted above. In the embodiments shown in FIGS. 4 and 5, the Type-1 DL subframes set includes subframe #0, #1, #4, #5, #6 and subframe #9; and the Type-2 DL subframes set includes subframe #2, #3, #7 and subframe #8.

The HARQ-ACK timing sequence of all of Type-1 DL subframes on the SCell may follow the PCell UL/DL SIB1 configuration.

For Type-2 DL subframes in FIG. 4, according to Table 3, HARQ-ACK for subframes #2 and #3 may be transmitted on subframe #7 of the same radio frame on PCell, while the HARQ-ACK for subframes #7 and #8 on SCell may be transmitted on subframe #2 of the next radio frame on the PCell.

One drawback of Alt.1 may be that the PUCCH overhead is not distributed over all uplink subframes on the PCell. As a consequence, it may complicate the eNB scheduler design considering uplink non-adaptive retransmission. To address this drawback, some embodiments may use the following alternate solution:

Alt.2: In some embodiments, it may be more useful to distribute the ACK/NACKs of different DL subframes as evenly as possible. The HARQ-ACK for a downlink channel (e.g. PDSCH) transmission in subframe n-k, where k>=4, may be transmitted in the uplink subframe n. The exact HARQ-ACK timing sequence could be summarized in Table 4:

TABLE 4

Downlink association set index K: {$k_0, k_1, \ldots k_{M-1}$} for FDD on SCell.

| UL/DL Configuration on PCell | 0 | 1 | 2 | 3 | 4 | 5 | 6 | 7 | 8 | 9 |
|---|---|---|---|---|---|---|---|---|---|---|
| 0 | — | — | 6, 5 | 5 | 4, 5 | — | — | 6, 5 | 5 | 4, 5 |
| 1 | — | — | 7, 6, 5 | 4, 5 | — | — | — | 7, 6, 5 | 4, 5 | — |
| 2 | — | — | 8, 7, 4, 6, 5 | — | — | — | — | 8, 7, 4, 6, 5 | — | — |
| 3 | — | — | 7, 6, 11, 10 | 6, 5, 10 | 5, 4, 10 | — | — | — | — | — |
| 4 | — | — | 12, 8, 7, 11, 10 | 6, 5, 4, 7, 10 | — | — | — | — | — | — |
| 5 | — | — | 13, 12, 9, 8, 7, 5, 4, 11, 6, 10 | — | — | — | — | — | — | — |
| 6 Option 1 | — | — | 7, 5 | 7, 5 | 5 | — | — | 7, 5, 4 | 7, 4 | — |
| Option 2 | — | — | 7, 8 | 7, 6 | 5, 6 | — | — | 7, 5 | 7, 5 | — |

Note:
"x" is a HARQ-ACK timing sequence for Type-2 DL subframes and "y" (i.e. not underlined) is HARQ-ACK timing sequence for Type-1 DL subframes.

FIG. 5 provides an example of HARQ-ACK distribution assuming a TDD configuration #1 may be in use on the PCell. As may be expected, the overall uplink channel (e.g. PUCCH) payload is distributed evenly as much as possible with this Alt.2 method. On the other hand, one issue arising from the Alt.2 method may be some difficulty in ensuring latency fairness for any consecutive HARQ processes used on the SCell. For example, as shown in FIG. 6, a downlink channel (e.g. PDSCH) on DL subframe #1 601 may be transmitted earlier than the downlink channel (e.g. PDSCH) on subframe #2 602. However, the corresponding HARQ-ACK for downlink subframe #1 601 may be feedback later than the HARQ-ACK for the downlink subframe #2 602. This is shown in FIG. 6, as the cross over point 603. This issue may be at least observed when Option 1 or Option 2 is applied for a case of TDD UL/DL configuration #6 103 being in use on the PCell. To address this fairness issue, further embodiments described below may provide an additional HARQ-ACK timing sequence selection design focusing on the problematic case as summarized in Table 5.

TABLE 5

Downlink association set index K: {$k_0, k_1, \ldots k_{M-1}$} for FDD on SCell in case of TDD configuration #6 in use on PCell.

| UL-DL Configuration on PCell | 0 | 1 | 2 | 3 | 4 | 5 | 6 | 7 | 8 | 9 |
|---|---|---|---|---|---|---|---|---|---|---|
| 6 | — | — | 7, 8 | 7, 6 | 5, 6 | — | — | 7 | 7, 6, 5 | — |

Note:
"x" is a HARQ-ACK timing sequence for Type-2 DL subframes and "y" (i.e. not underlined) is HARQ-ACK timing sequence for Type-1 DL subframes.

A second set of embodiments may also comprise an apparatus, e.g. UE apparatus, (and a corresponding method) for selecting a suitable HARQ-ACK timing sequence in which a type-specific HARQ timing sequence relationship is followed for downlink data subframes (e.g. PDSCH subframes) on the serving cell deployed with FDD DL (or TDD) configuration wherein, in this example, all subframes are downlink.

Similar to the first set of embodiments, in these alternative embodiments, the HARQ timing sequence of a PCell downlink channel (e.g. PDSCH) may follow the PCell SIB1 UL/DL configuration, which may be a TDD UL/DL configuration from a previous release of a 3GPP LTE standard (e.g., Rel-8/9/10/11). In these second set of embodiments, the HARQ timing sequence for a downlink channel (e.g. PDSCH) transmission on the SCell may be determined differently from previous embodiments. For example, a HARQ-ACK for a downlink channel (e.g. PDSCH) transmission on the SCell in subframe n-k, where k>=4, may be transmitted in the first available UL subframe n on PCell, where the appropriate values for k are determined irrespective of the type of the DL subframe (on SCell).

For an embodiment where the downlink channel (e.g. PDSCH) transmission indicated by the detection on a corresponding control channel (e.g. PDCCH) or there is detection of information on a corresponding control channel (e.g. PDCCH) indicating a downlink semi-persistent scheduling (SPS) release within subframe n-k, where k∈K and where K (as defined in, for example Table 6 or Table 7, below) is a set of M elements {$k_0, k_1, \ldots k_{M-1}$} depending on the subframe n, the UL/DL configuration on PCell, the corresponding HARQ-ACK may be transmitted in a uplink subframe n on PCell. The exact HARQ-ACK timing sequence could be summarized as per Table 6:

TABLE 6

Downlink association set index K: {$k_0, k_1, \ldots k_{M-1}$} for FDD on SCell an alternative embodiment.

| UL/DL Configuration on PCell | 0 | 1 | 2 | 3 | 4 | 5 | 6 | 7 | 8 | 9 |
|---|---|---|---|---|---|---|---|---|---|---|
| 0 | — | — | 6, 5, 4 | 4 | 4 | — | — | 6, 5, 4 | 4 | 4 |
| 1 | — | — | 7, 6, 5, 4 | 4 | — | — | — | 7, 6, 5, 4 | 4 | — |
| 2 | — | — | 8, 7, 4, 6, 5 | — | — | — | — | 8, 7, 4, 6, 5 | — | — |

TABLE 6-continued

Downlink association set index K: {k₀, k₁, ... k_{M-1}}
for FDD on SCell an alternative embodiment.

| UL/DL Configuration on PCell | \multicolumn{10}{c}{Subframe n} |
|---|---|---|---|---|---|---|---|---|---|---|
| | 0 | 1 | 2 | 3 | 4 | 5 | 6 | 7 | 8 | 9 |
| 3 | — | — | 7, 6, 11, 10, 9, 8, 5, 4 | 4 | 4 | — | — | — | — | — |
| 4 | — | — | 12, 8, 7, 11, 10, 9, 6, 5, 4 | 4 | — | — | — | — | — | — |
| 5 | — | — | 13, 12, 9, 8, 7, 5, 4, 11, 6, 10 | — | — | — | — | — | — | — |
| 6 | — | — | 7, 6, 5, 4 | 4 | 4 | — | — | 6, 5, 4 | 4 | — |

In some embodiments, the HARQ-ACK payloads may not be distributed evenly over all uplink subframes on a PCell with the method of Table 6. For example, HARQ-ACK payloads from SCell mostly concentrated on subframe #2 on PCell only and may consequently complicate uplink Semi-Persistence Scheduling (SPS) uplink channel configuration or resource allocation (e.g. PUSCH configuration and PUCCH resource allocation). Therefore, in some further embodiments, the HARQ timing sequence configuration of Table 7 could be used in the alternative, to provide more evenly distributed HARQ-ACK responses.

TABLE 7

Downlink association set index K: {k₀, k₁, ... k_{M-1}}
for FDD on SCell a further alternative embodiment.

| UL/DL Configuration on PCell | \multicolumn{10}{c}{Subframe n} |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 4, 6, 5 | — | — | — | 7, 6 | 4, 6, 5 | — |
| 2 | — | — | 8, 7, 4, 6, 5 | — | — | — | — | 8, 7, 4, 6, 5 | — | — |
| 3 Option 1 | — | — | 11, 10, 9, 8 | 8, 7, 6 | 6, 5, 4 | — | — | — | — | — |
| 3 Option 2 | — | — | 11, 10, 9 | 9, 8, 7, 6 | 6, 5, 4 | — | — | — | — | — |
| 4 | — | — | 12, 11, 10, 9, 8 | 8, 7, 6, 5, 4 | — | — | — | — | — | — |
| 5 | — | — | 13, 12, 9, 8, 7, 5, 4, 11, 6, 10 | — | — | — | — | — | — | — |
| 6 | — | — | 7, 8 | 6, 5 | 5, 6 | — | — | 7, 6 | 6, 5 | — |

As shown in the example of Table 7, two candidate HARQ-ACK timing sequence relationships may be used (in the alternative) for the case where UL/DL TDD configuration #3 is in use on the PCell. Generally, Option 1 evenly distributes the HARQ-ACK payload from SCell only, while Option 2 considers the overall HARQ-ACK payload from both PCell and SCell. Option 1 provides slightly shorter latency for some downlink channel (e.g. PDSCH) retransmission(s), but HARQ-ACK payloads may not be distributed as evenly as with Option 2.

The HARQ timing sequence of a PCell downlink channel (e.g. PDSCH) may follow the PCell SIB1 UL/DL configuration, which may be the same as a previous release of a 3GPP LTE standard (e.g., Rel-8/9/10/11). For a downlink channel (e.g. PDSCH) on the SCell, the HARQ-ACK timing sequence configuration in use may follow one DL-reference UL/DL configuration dependent upon the DL-to-UL switch-point periodicity of the UL/DL configuration in use on the PCell, as illustrated in Table 8. This solution generally considers a given specification/implementation effort/cost versus desired downlink throughput performance—i.e. it is a trade-off, dependent on a particular arrangement of the wireless communications network, and may only provide for a fraction of DL subframes to be utilized for a respective TDD-FDD CA scenario.

TABLE 8 a DL-reference UL/DL configuration for downlink channel (e.g. PDSCH)
HARQ-ACK timing sequence on a FDD configured downlink SCell
based on DL-to-UL switch-point periodicity on the PCell
according to a further alternative embodiment.

| Uplink-downlink Configuration on PCell | Downlink-to-Uplink Switch-point periodicity | DL-reference UL/DL configuration |
|---|---|---|
| 0, 1, 2, 6 | 5 ms | 2 |
| 3, 4, 5 | 10 ms | 5 |

Figure 7:
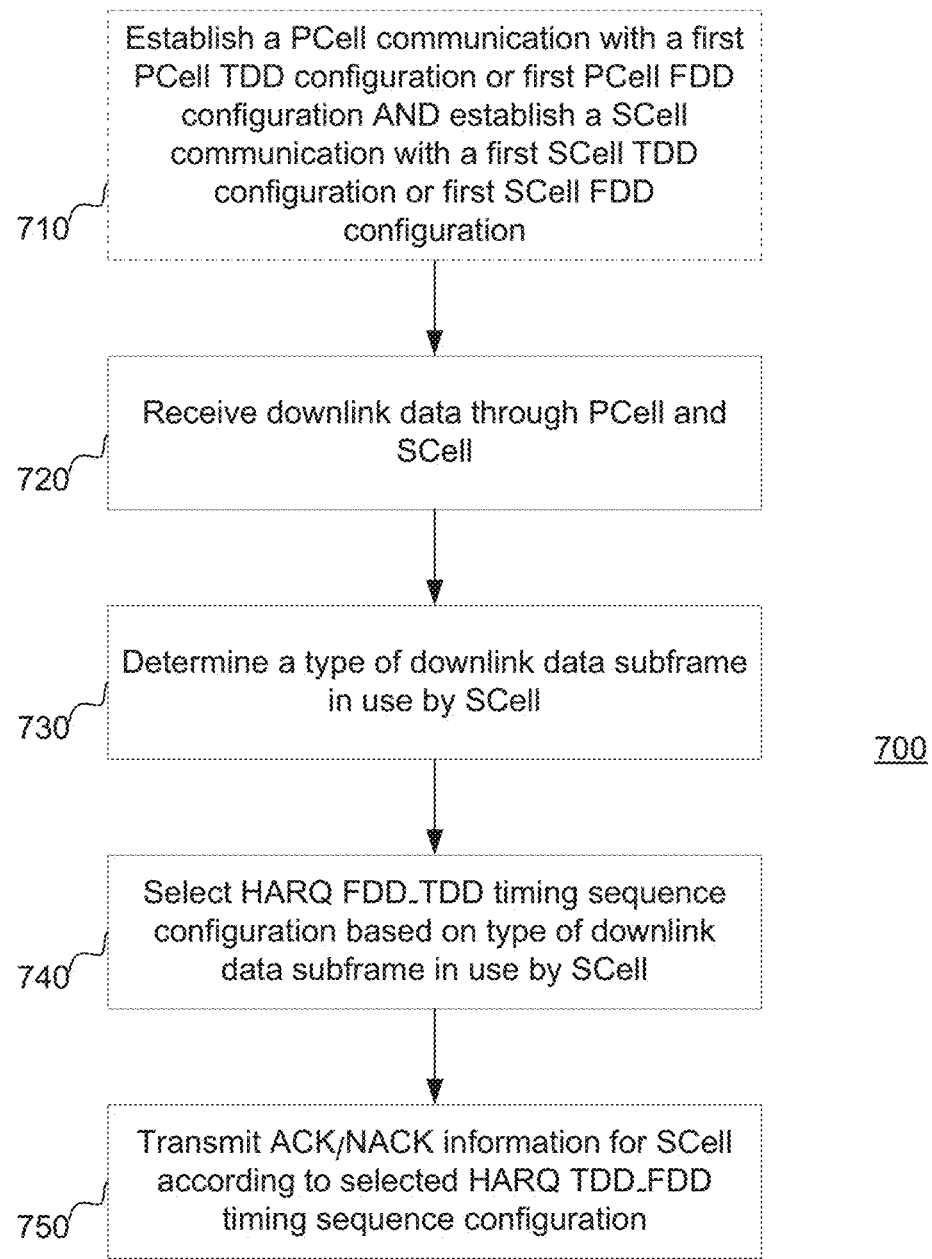
FIG. 7 is a flowchart illustrating selection of HARQ signal scheduling for SCell downlink subframes in accordance with various embodiments.

FIG. 7 is a flowchart illustrating a method 700 of selecting a HARQ timing sequence (i.e. selecting a HARQ scheduling configuration) in accordance with various embodiments.

At block 710, UE 108 may establish a connection to (i.e. associate with), over a suitable channel, a PCell with a first TDD configuration or a first FDD configuration and establish a connection to (i.e. associate with), over a suitable channel, a SCell with a second TDD configuration or a second FDD configuration. In some embodiments, the UE 108 may establish a connection to the PCell with the first TDD configuration or second FDD configuration based on information received in an SIB1 broadcast from a base station, e.g., eNB 104. In some embodiments, the UE 108 may establish a connection to the SCell with the second TDD configuration or second FDD configuration based on information received, from the eNB 104, in radio resource control (RRC) signaling through the PCell.

At block 720, UE 108 may receive downlink data through the PCell and SCell, i.e. over a downlink channel served from the respective PCell and SCell.

At block 730, UE 108 may determine a type of downlink data subframe that is in use by the SCell (and optionally by the PCell, in some embodiments). These may be referred to as the above described Type-1 and Type-2 downlink subframes types.

At block 740, UE 108 may select a hybrid automatic repeat request (HARQ) timing sequence configuration (for use on the PCell and/or the SCell) based on the type of downlink data subframe in use by the SCell; and At block 750, UE 108 may transmit acknowledgement information associated with the downlink data according to the selected hybrid automatic repeat request (HARQ) timing sequence configuration on PCell. UE 108 may execute method 700, according to various embodiments.

Figure 8:
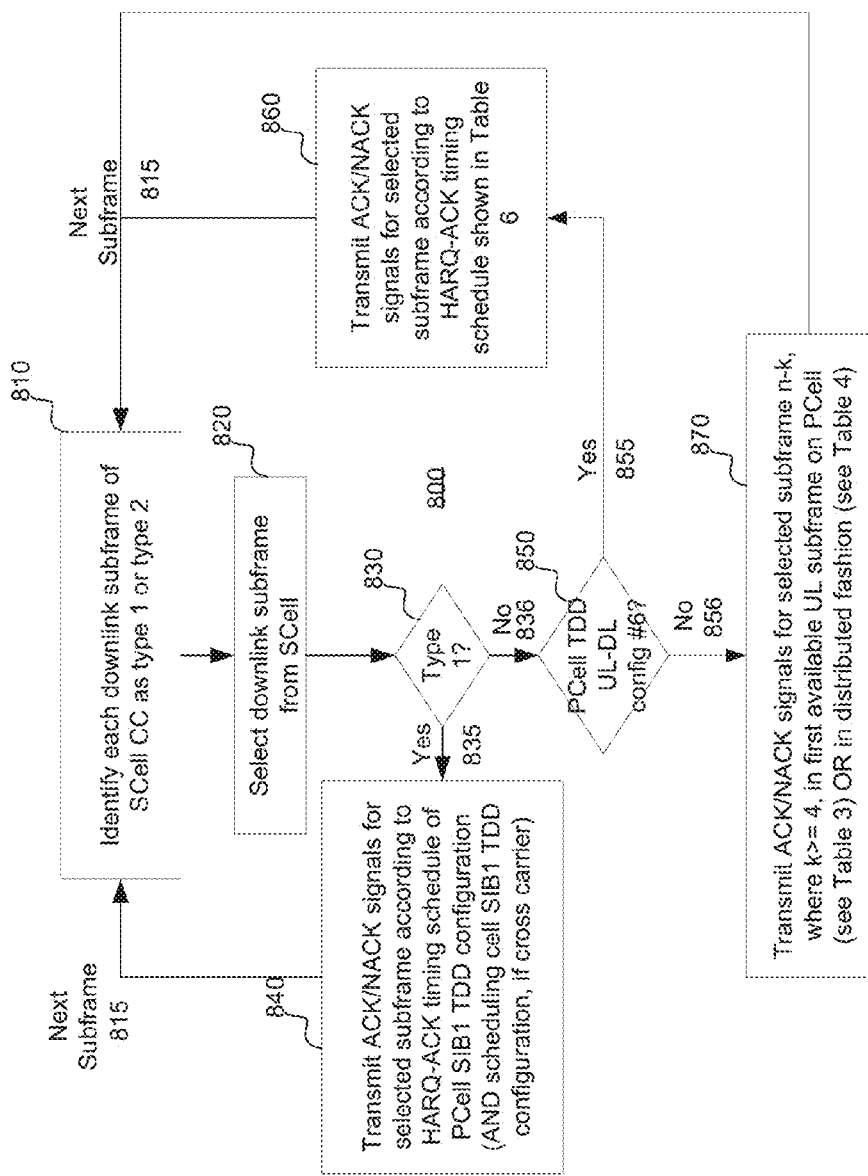
FIG. 8 is a flowchart illustrating selection of HARQ signal scheduling for SCell downlink subframes in accordance with various embodiments.

FIG. 8 is a flowchart illustrating a method 800 of selecting hybrid automatic repeat request (HARQ) timing configuration in accordance with various embodiments. UE 108 may execute method 800 as an alternative to or in combination with method 700, according to various embodiments.

At block 810, UE 108 may identify each downlink subframe of component carriers of the SCell as a Type-1 subframe or a Type-2 subframe, as discussed above.

At block 820, UE 108 may select a downlink subframe from the SCell.

At block 830, UE 108 may determine whether a downlink subframe is Type-1. If the downlink subframe is Type-1 835, then method 800 goes to block 840.

At block 840, UE 108 transmits ACK/NACK signals for the selected downlink subframe according to a timing sequence schedule of the TDD configuration of the PCell from the PCell SIB1 (and, additionally, taking into account the scheduling cell SIB1 TDD configuration, if a cross carrier configuration is in use on the respective wireless communication network). Method 800 then returns to block 810 for the next downlink subframe 815.

Returning to block 830, if the downlink subframe is not Type 1 836, then method 800 goes to block 850, to determine if the PCell UL/DL configuration #6 is in use. If the PCell UL/DL configuration #6 is in use 855, then the method goes to block 860. If the PCell UL/DL configuration #6 is in not use 856, then the method goes to block 870.

At block 860, UE 108 transmits ACK/NACK signals for the selected subframe according to the HARQ-ACK timing sequence schedule shown in Table 6. Method 800 then returns to block 810 for the next downlink subframe 815.

At block 870, UE 108 transmits ACK/NACK signals for selected subframe n-k, where k>=4, in a first available uplink subframe on the PCell (see Table 3), alternatively, UE 108 may transmit ACK/NACK signals for selected subframe n-k, where k>=4, in a in distributed fashion (see Table 4). Method 800 then returns to block 810 for the next downlink subframe 815.

Figure 9:
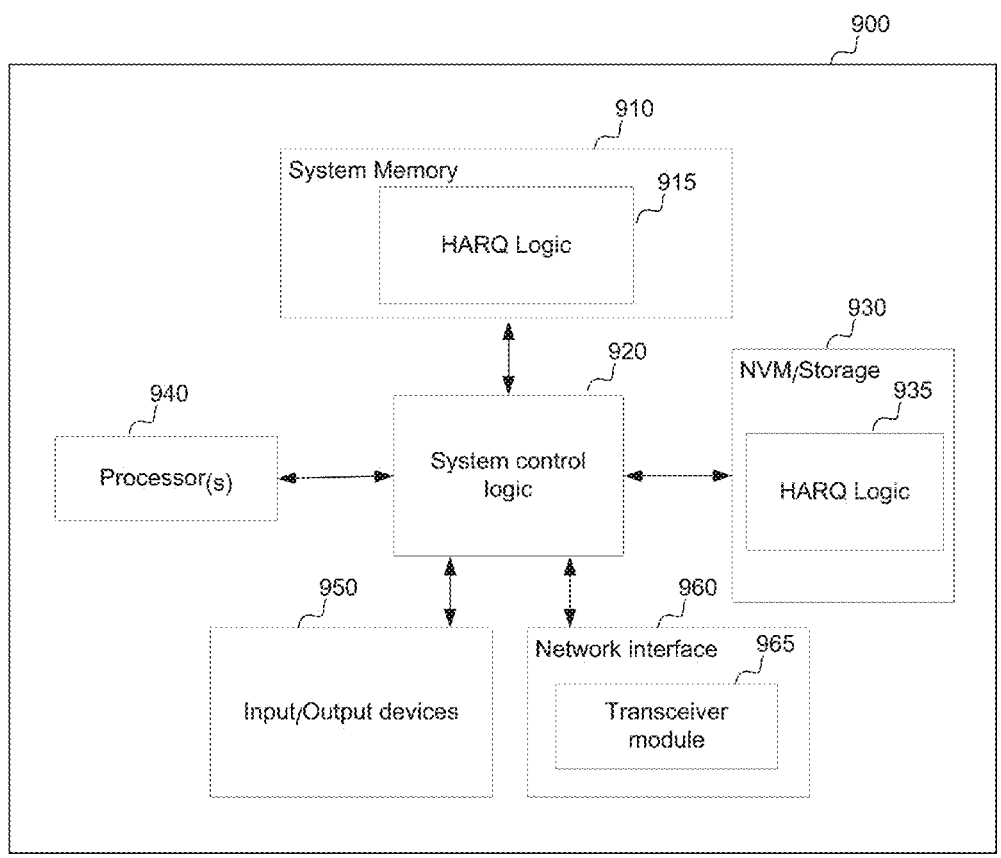
FIG. 9 schematically depicts an example system in accordance with various embodiments.

The eNB 104 and UE 108 described herein may be implemented into a system using any suitable hardware and/or software configured to operate as described. FIG. 9 illustrates, for one embodiment, an example system 900 comprising one or more processor(s) 940, system control logic 920 coupled with at least one of the processor(s) 940, system memory 910 coupled with system control logic 920, non-volatile memory (NVM)/storage 930 coupled with system control logic 920, and a network interface 960 coupled with system control logic 920. The system control logic 920 may also be coupled to Input/Output devices 950.

Processor(s) 940 may include one or more single-core or multi-core processors. Processor(s) 940 may include any combination of general-purpose processors and/or dedicated processors (e.g., graphics processors, application processors, baseband processors, etc.). Processors 940 may operate upon or with HARQ logic, operable to carry out the above described apparatuses and methods for selecting a suitable HARQ response timing sequence, using suitable instructions or programs. The HARQ logic, in the form of such instructions, may be stored in system memory 910, as a HARQ logic portion 915, or additionally or alternatively may be stored in (NVM)/storage 930, as a HARQ logic portion 935.

Processors(s) 940 may include processor module 152 and be configured to execute the embodiments of FIGS. 2-8 in accordance with various embodiments. In an embodiment in which the system 900 implements an eNB 104, processor(s) 940 may include processor module 128 and be configured to decode the HARQ ACK/NACK information transmitted by UE 108.

System control logic 920 for one embodiment may include any suitable interface controllers to provide for any suitable interface to at least one of the processor(s) 940 and/or to any suitable device or component in communication with system control logic 920.

System control logic 920 for one embodiment may include one or more memory controller(s) to provide an interface to system memory 910. System memory 910 may be used to load and store data and/or instructions, for example, for system 900. System memory 910 for one embodiment may include any suitable volatile memory, such as suitable dynamic random access memory (DRAM), for example.

NVM/storage 930 may include one or more tangible, non-transitory computer-readable media used to store data and/or instructions, for example. NVM/storage 930 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 930 may include a storage resource physically part of a device on which the system 900 is installed or it may be accessible by, but not necessarily a part of, the device. For example, the NVM/storage 930 may be accessed over a network via the network interface 960.

System memory 910 and NVM/storage 930 may respectively include, in particular, temporal and persistent copies of, for example, the HARQ logic instructions 915 and 935, respectively. Instructions HARQ logic instructions 915 and 935 may include instructions that when executed by at least one of the processor(s) 940 result in the system 900 implementing a one or both of methods 700 and 800, or the method(s) of any other embodiment, as described herein. In some embodiments, HARQ logic instructions 915 and 935, or hardware, firmware, and/or software components thereof, may additionally/alternatively be located in the system control logic 920, the network interface 960, and/or the processor(s) 940.

Network interface 960 may have a transceiver module 965 to provide a radio interface for system 900 to communicate over one or more network(s) (e.g. wireless communication network) and/or with any other suitable device. The transceiver 965 may be implement receiver module 144/120 and/or transmitter module 148/124. In various embodiments, the transceiver 965 may be integrated with other components of system 900. For example, the transceiver 965 may include a processor of the processor(s) 940, memory of the system memory 910, and NVM/Storage of NVM/Storage 930. Network interface 960 may include any suitable hardware and/or firmware. Network interface 960 may be operatively coupled to a plurality of antennas 156/130 to provide a multiple input, multiple output radio interface. Network interface 960 for one embodiment may include, for example, a network adapter, a wireless network adapter, a telephone modem, and/or a wireless modem.

For one embodiment, at least one of the processor(s) 940 may be packaged together with logic for one or more controller(s) of system control logic 920. For one embodiment, at least one of the processor(s) 940 may be packaged together with logic for one or more controllers of system control logic 920 to form a System in Package (SiP). For one embodiment, at least one of the processor(s) 940 may be integrated on the same die with logic for one or more controller(s) of system control logic 920. For one embodiment, at least one of the processor(s) 940 may be integrated on the same die with logic for one or more controller(s) of system control logic 920 to form a System on Chip (SoC).

In various embodiments, the I/O devices 950 may include user interfaces designed to enable user interaction with the system 900, peripheral component interfaces designed to enable peripheral component interaction with the system 900, and/or sensors designed to determine environmental conditions and/or location information related to the system 900.

Figure 10:
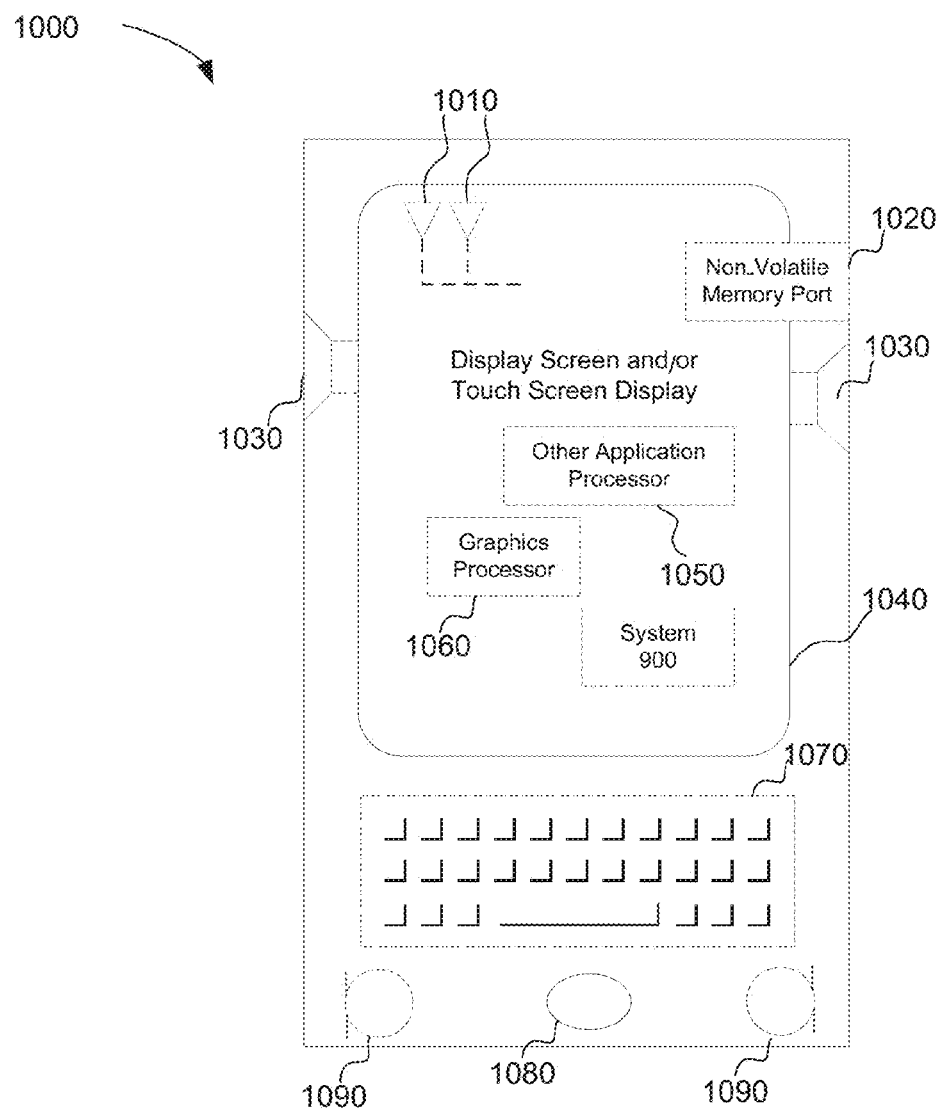
FIG. 10 schematically depicts an example mobile device in accordance with various embodiments.

FIG. 10 shows an embodiment in which the system 900 implements a UE 108 in the specific form of a mobile device 1000.

In various embodiments, the user interfaces could include, but are not limited to, a display 1040 (e.g., a liquid crystal display, a touch screen display, etc.), a speaker 1030, a microphone 1090, one or more cameras 1080 (e.g., a still camera and/or a video camera), a flashlight (e.g., a light emitting diode flash), and a keyboard 1070.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 960 to communicate with components of a positioning network, e.g., a global positioning system (GPS) satellite.

In various embodiments, the system 900 may be a mobile computing device such as, but not limited to, a laptop computing device, a tablet computing device, a netbook, a mobile phone, etc. In various embodiments, system 900 may have more or less components, and/or different architectures.

Various embodiments may provide a user equipment (UE) comprising processing circuitry configured to establish a connection to a primary serving cell (PCell) and a secondary serving cell (SCell) of an enhanced-Node B (eNB), the PCell having a first TDD or first FDD configuration, the SCell having a second FDD or second TDD configuration, receive downlink data through the PCell and SCell, categorize a type of downlink data subframe in use by the SCell, select a hybrid automatic repeat request (HARQ) timing sequence configuration for use with downlink data received from the SCell based on the type of downlink data subframe received and transmit acknowledgement information associated with the downlink data according to the selected hybrid automatic repeat request (HARQ) timing sequence configuration on the PCell.

In various embodiments, the processing circuitry is further configured to select a hybrid automatic repeat request (HARQ) timing sequence configuration for use by the PCell based on the type of downlink data subframe.

In various embodiments, the processing circuitry is further configured to select a hybrid automatic repeat request (HARQ) timing sequence configuration for use on the PCell based on either a PCell TDD uplink-downlink timing sequence configuration indicated in a received first system information block (SIB1) when the PCell is TDD configured or on a FDD HARQ timing sequence configuration when the PCell is FDD configured.

In various embodiments, a type of downlink data subframe in use by the SCell is a first type downlink data subframe or a second type downlink data subframe.

In various embodiments, the first type downlink data subframe comprises a subframe that is a downlink data subframe on both the PCell and the SCell, or that is a downlink data subframe on both a scheduling cell and a scheduled cell in a case of a cross-carrier scheduling configuration, and wherein more than one TDD serving cell is configured and the configured scheduling cell is not the PCell, and/or wherein the second type of downlink data subframe comprises a subframe that is downlink only on the SCell.

In various embodiments, the UE is configured for use with more than one serving cell and if at least one of the more than one serving cell is deployed with a TDD uplink-downlink (UL-DL) configuration, and other ones of the more than one serving cell are deployed with a different full-downlink (full-DL) TDD configuration or FDD configuration, and wherein if a serving cell deployed with a TDD UL/DL configuration is set as the PCell, then the processing circuitry is further configured to select the HARQ timing sequence configuration for use with the PCell and SCell, respectively, are defined as follows:

wherein, for a downlink channel on the SCell deployed with FDD or full-DL TDD configuration, if a downlink channel transmission is indicated by the detection of a corresponding downlink control channel or if a downlink control channel indicates a downlink Semi-Persistence Scheduling (SPS) release within subframe n-k, where k∈K and K, wherein K is a set of M elements {k0, k1, . . . k(M−1)} defined in Table 3 to Table 5, depending on the subframe n, the processing circuitry is further configured to select the HARQ timing sequence configuration for use on the PCell as follows:

a) if the downlink data subframe is a first type of downlink data subframe, then the HARQ timing sequence configuration selected follows a PCell SIB1 TDD timing sequence configuration regardless of cross-carrier scheduling or self-scheduling configuration, or alternatively follow a DL-reference UL/DL timing sequence configuration, wherein the DL-reference UL/DL configuration is jointly determined by a scheduling cell SIB1 TDD configuration and a PCell SIB1 timing sequence configuration in case of cross-carrier scheduling as shown in Table 2;

b) if the downlink data subframe is a second type of downlink data subframe, the HARQ timing sequence configuration selected for use is defined by the following different alternatives:

i) the selected HARQ timing sequence configuration for DL data transmission in subframe n-k, where k>=4, comprises transmitting a HARQ in a first available UL subframe n on PCell;

ii) the HARQ timing sequence configuration selected for DL data transmission in subframe n-k, where k>=4, comprises transmitting a HARQ in an available UL subframe n on PCell in a distributed fashion across available UL subframes.

In various embodiments, the HARQ timing sequence configuration for use on the SCell for DL subframe n-k, where k>=4, is transmitted in a first available uplink data subframe n on the PCell, where in appropriate values for k are determined irrespective of a type of downlink data subframe in use on the SCell.

In various embodiments, a downlink channel on the SCell, if the SCell is deployed with FDD or full-DL TDD configuration, if a downlink channel transmission is indicated by the detection of a corresponding downlink control channel or if a downlink control channel indicates a downlink SPS release within subframe n-k, where k∈K and K is a set of M elements {k0, k1, ... k(M−1)} depending on the subframe n, wherein a UL/DL timing sequence configuration for use on the PCell is defined in Table 6 and Table 7.

In various embodiments, a downlink channel on the SCell, the HARQ timing sequence configuration used follows one DL-reference UL/DL configuration depending on the DL-to-UL switch-point periodicity of a UL/DL configuration in use on the PCell, as illustrated in Table 8.

In various embodiments, one DL-reference UL/DL configuration is TDD UL/DL configuration 2 if DL-to-UL switch-point periodicity of a UL/DL configuration on PCell is 5 milliseconds (ms).

In various embodiments, one DL-reference UL/DL configuration is TDD UL/DL configuration 5 if DL-to-UL switch-point periodicity of a UL/DL configuration on PCell is 10 ms.

In various embodiments, the processing circuitry is configured to transmit acknowledgement information associated with the downlink data according to the selected hybrid automatic repeat request (HARQ) timing sequence configuration and comprises being configured to transmit acknowledgement information on a physical uplink shared channel (PUSCH) on the PCell.

In various embodiments, the processing circuitry is configured to transmit acknowledgement information comprising transmitting for a PCell PDSCH or a SCell PDSCH on a UL subframe of a PUSCH or physical uplink control channel (PUCCH) on PCell.

In various embodiments, there may be provided a User Equipment (UE) comprising processing circuitry configured to receive a downlink data subframe from a PCell and a SCell, wherein the PCell and the SCell are set up between the UE and an enhanced-Node B (eNB) in a time division duplex-frequency division duplex (TDD-FDD) carrier aggregation (CA) formation, determine a type of downlink data subframe received from the SCell, select a hybrid automatic repeat request (HARQ) timing sequence configuration for use by the UE for data received from the SCell based on the type of downlink data subframe.

In various embodiments, the processing circuitry is further configured to transmit an acknowledgement using the selected HARQ timing sequence configuration.

In various embodiments, the processing circuitry is further configured to detect a downlink control channel transmission, and wherein, for a downlink channel on the SCell deployed with FDD or full-DL TDD configuration, if a downlink channel transmission is indicated by a detection of a corresponding downlink control channel or if a downlink control channel indicates a downlink Semi-Persistence Scheduling (SPS) release within subframe n-k, where k∈K and K, wherein K is a set of M elements {k0, k1, ... k(M−1)} defined in Table 3 to Table 5, depending on the subframe n, the UE is further configured to select a HARQ timing sequence configuration for use on the PCell indicated by a PCell SIB1 TDD timing sequence configuration.

In various embodiments, the processing circuitry is further configured to select the HARQ timing sequence configuration for use on the PCell in accordance with Table 2.

In various embodiments, the processing circuitry is further configured to select the HARQ timing sequence configuration for use on the PCell in accordance with any of tables 3 to 5.

In various embodiments, the processing circuitry is further configured to select the HARQ timing sequence configuration for use on the PCell in accordance with either table 6 or 7.

In various embodiments, the processing circuitry is further configured to select the HARQ timing sequence configuration for use on the PCell in accordance with Table 8.

Various embodiments may provide a method for selecting a suitable acknowledgement timing configuration in a time division duplex-frequency division duplex (TDD-FDD) carrier aggregation (CA) enabled wireless communication network, comprising establishing, by a user equipment (UE), a connection to a primary serving cell (PCell) and a secondary serving cell (SCell) of an enhanced-Node B (eNB), the PCell having a first TDD or first FDD configuration, the SCell having a second FDD or second TDD configuration, receiving, by the UE, downlink data through the PCell and SCell, categorizing a type of downlink data subframe in use by the SCell, selecting, by the UE, a hybrid automatic repeat request (HARQ) timing sequence configuration for use by the SCell based on the type of downlink data subframe, and transmitting acknowledgement information associated with the downlink data according to the selected hybrid automatic repeat request (HARQ) timing sequence configuration on the PCell.

In various embodiments a type of downlink data subframe in use by the SCell is a first type downlink data subframe or a second type downlink data subframe, wherein the first type downlink data subframe comprises a subframe that is a downlink data subframe on both the PCell and the SCell, or that is a downlink data subframe on both a scheduling cell and a scheduled cell in a case of a cross-carrier scheduling configuration, and wherein more than one TDD serving cell is configured and the configured scheduling cell is not the PCell. Additionally or alternatively, the second type of downlink data subframe comprises a subframe that is downlink only on the SCell.

In various embodiments, if a UE is configured for use with more than one serving cell and if at least one of the more than one serving cell is deployed with a TDD uplink-downlink (UL-DL) configuration, and other ones of the more than one serving cell are deployed with a different full-downlink (full-DL) TDD configuration or FDD configuration, and wherein if a serving cell deployed with a TDD UL/DL configuration is set as the PCell, then the HARQ timing sequence configurations set for use with the PCell and SCell, respectively, are defined as follows: for a downlink channel on the SCell deployed with FDD or full-DL TDD configuration, if a downlink channel transmission is indicated by the detection of a corresponding downlink control channel or if a downlink control channel indicates a downlink Semi-Persistence Scheduling (SPS) release within subframe n-k, where k∈K and K, wherein K is a set of M elements {k0, k1, ... k(M−1)} defined in Table 3 to Table 5, depending on the subframe n, wherein a UL/DL timing sequence configuration for use on the PCell is defined as follows:

c) if the downlink data subframe is a first type of downlink data subframe, then the HARQ timing sequence configuration used should follow a PCell SIB1 TDD timing sequence configuration regardless of cross-carrier scheduling or self-scheduling configuration, or alternatively follow a DL-reference UL/DL timing sequence configuration, wherein the DL-reference UL/DL configuration is jointly determined by a scheduling cell SIB1 TDD configuration and a PCell SIB1 timing sequence configuration in case of cross-carrier scheduling as shown in Table 2;

d) if the downlink data subframe is a second type of downlink data subframe, the HARQ timing sequence configuration for use is defined by the following different alternatives:

i) the HARQ timing sequence configuration for DL data transmission in subframe n-k, where k>=4, comprises transmitting a HARQ in a first available UL subframe n on PCell;

ii) the HARQ timing sequence configuration for DL data transmission in subframe n-k, where k>=4, comprises transmitting a HARQ in an available UL subframe n on PCell in a distributed fashion across available UL subframes.

Various embodiments may provide at least one machine readable medium comprising a plurality of non-transitory instructions that, in response to being executed on a computing device, cause the computing device to carry out any of the described methods. Various embodiments include any sort of device or hardware arranged, configured, adapted or instructed to carry out any portion of any method disclosed herein, and may include any device or hardware in an unpowered state that may be only be configured to carry out a particular task on powering up, or at a subsequent time period after first use.

One skilled in the art understands that a "processing circuitry configured to" performs a function comprising at least one of "hardware configured to", "software configured to" and a "combination of hardware and software configured to" perform that function.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A user equipment (UE) comprising processing circuitry configured to:

establish a connection to a primary serving cell (PCell) and a secondary serving cell (SCell) of an enhanced-Node B (eNB) configured for Time Division Duplex (TDD)-Frequency Division Duplex (FDD) carrier aggregation (CA), the PCell having a first TDD or first FDD configuration, the SCell having a second FDD or second TDD configuration such that only one of the PCell and the SCell have a TDD configuration and only one of the PCell and the SCell have a FDD configuration, such that the PCell and the SCell include both of the TDD configuration and the FDD configuration;

receive downlink data through the PCell and SCell;

categorize a type of downlink data subframe in use by the SCell;

select a hybrid automatic repeat request (HARQ) timing sequence configuration for use with downlink data received from the SCell based on the type of downlink data subframe received;

select a hybrid automatic repeat request (HARQ) timing sequence configuration for use on the PCell based on a PCell TDD uplink-downlink timing sequence configuration indicated in a received first system information block (SIB1) when the PCell is TDD configured;

select a hybrid automatic repeat request (HARQ) timing sequence configuration for use on the PCell based on a FDD HARQ timing sequence configuration when the PCell is FDD configured; and transmit acknowledgement information associated with the downlink data according to the selected hybrid automatic repeat request (HARQ) timing sequence configuration on the PCell, wherein the HARQ timing sequence configuration for use on the SCell for DL subframe n-k, where k>=4, is transmitted in a first available uplink data subframe n on the PCell, wherein appropriate values for k are determined irrespective of a type of downlink data subframe in use on the SCell.

2. The UE of claim 1, wherein the processing circuitry is further configured to select a hybrid automatic repeat request (HARQ) timing sequence configuration for use by the PCell based on the type of downlink data subframe.

3. The UE of claim 1, wherein a type of downlink data subframe in use by the SCell is a first type downlink data subframe or a second type downlink data subframe;

wherein the first type downlink data subframe comprises a subframe that is a downlink data subframe on both the PCell and the SCell, or that is a downlink data subframe on both a scheduling cell and a scheduled cell in a case of a cross-carrier scheduling configuration, and wherein more than one TDD serving cell is configured and the configured scheduling cell is not the PCell; and/or wherein the second type of downlink data subframe comprises a subframe that is downlink only on the SCell.

4. The UE of claim 3, wherein if the UE is configured for use with more than one serving cell and if at least one of the more than one serving cell is deployed with a TDD uplink-downlink (UL-DL) configuration, and other ones of the more than one serving cell are deployed with a different full-downlink (full-DL) TDD configuration or FDD configuration, and wherein if a serving cell deployed with a TDD UL/DL configuration is set as the PCell, then the processing circuitry is further configured to select the HARQ timing sequence configuration for use with the PCell and SCell, respectively, are defined as follows:

wherein, for a downlink channel on the SCell deployed with FDD or full-DL TDD configuration, if a downlink channel transmission is indicated by the detection of a corresponding downlink control channel or if a downlink control channel indicates a downlink Semi-Persistence Scheduling (SPS) release within subframe n-k, where k∈K and K, wherein K is a set of M elements $\{k_0, k_1, \ldots k_{(M-1)}\}$, depending on the subframe n, the processing circuitry is further configured to select the HARQ timing sequence configuration for use on the PCell as follows:

a) if the downlink data subframe is a first type of downlink data subframe, then the HARQ timing sequence configuration selected follows a PCell SIB1 TDD timing sequence configuration regardless of cross-carrier scheduling or self-scheduling configuration, or alternatively follow a DL-reference UL/DL timing sequence configuration, wherein the DL-reference UL/DL configuration is jointly determined by a scheduling cell SIB1 TDD configuration and a PCell SIB1 timing sequence configuration in case of cross-carrier scheduling;

b) if the downlink data subframe is a second type of downlink data subframe, the HARQ timing sequence configuration selected for use is defined by the following different alternatives:
  i) the selected HARQ timing sequence configuration for DL data transmission in subframe n-k, where k>=4, comprises transmitting a HARQ in a first available UL subframe n on PCell;
  ii) the HARQ timing sequence configuration selected for DL data transmission in subframe n-k, where k>=4, comprises transmitting a HARQ in an available UL subframe n on PCell in a distributed fashion across available UL subframes.

5. The UE of claim 1, wherein, for a downlink channel on the SCell, if the SCell is deployed with FDD or full-DL TDD configuration, a downlink channel transmission is indicated by the detection of a corresponding downlink control channel or if a downlink control channel indicates a downlink SPS release within subframe n-k, where k∈K and K is a set of M elements $\{k_0, k_1, \ldots k_{(M-1)}\}$ depending on the subframe n.

6. The UE of of claim 1, wherein, for a downlink channel on the SCell, the HARQ timing sequence configuration used follows one DL-reference UL/DL configuration depending on a DL-to-UL switch-point periodicity of a UL/DL configuration in use on the PCell.

7. The UE of claim 6, wherein one DL-reference UL/DL configuration is TDD UL/DL configuration 2 if DL-to-UL switch point periodicity of a UL/DL configuration on PCell is 5 milliseconds (ms) or 10 ms.

8. The UE of claim 1, wherein the processing circuitry is configured to transmit acknowledgement information associated with the downlink data according to the selected hybrid automatic repeat request (HARQ) timing sequence configuration and comprises being configured to transmit acknowledgement information on a physical uplink shared channel (PUSCH) on the PCell.

9. The UE of claim 1, wherein the processing circuitry is configured to transmit acknowledgement information comprising transmitting for a PCell PDSCH or a SCell PDSCH on a UL subframe of a PUSCH or physical uplink control channel (PUCCH) on PCell.

10. The UE of claim 1, wherein the HARQ timing sequence configuration for use on the SCell for DL subframe n-k, where k>=4, is transmitted in a first available uplink data subframe n on the PCell, where in appropriate values for k are determined irrespective of a type of downlink data subframe in use on the SCell.

11. User Equipment (UE) comprising processing circuitry configured to:
  receive a downlink data subframe from a PCell and a SCell, wherein the PCell and the SCell are set up between the UE and an enhanced-Node B (eNB) in a time division duplex frequency division duplex (TDD-FDD) carrier aggregation (CA) formation, such that only one of the PCell and the SCell have a TDD configuration and only one of the PCell and the SCell have a FDD configuration, such that the PCell and the SCell include both of the TDD configuration and the FDD configuration;
  determine a type of downlink data subframe received from the SCell;
  select a hybrid automatic repeat request (HARQ) timing sequence configuration for use by the UE for data received from the SCell based on the type of downlink data subframe, wherein the HARQ timing sequence configuration for use on the SCell for DL subframe n-k, where k>=4, is transmitted in a first available uplink data subframe n on the PCell, wherein appropriate values for k are determined irrespective of a type of downlink data subframe in use on the SCell;
  select a hybrid automatic repeat request (HARQ) timing sequence configuration for use on the PCell based on a PCell TDD uplink-downlink timing sequence configuration indicated in a received first system information block (SIB1) when the PCell is TDD configured; and
  select a hybrid automatic repeat request (HARQ) timing sequence configuration for use on the PCell based on a FDD HARQ timing sequence configuration when the PCell is FDD configured.

12. The UE of claim 11, wherein the processing circuitry is further configured to transmit an acknowledgement using the selected HARQ timing sequence configuration.

13. The UE of claim 11, wherein the processing circuitry is further configured to detect a downlink control channel transmission, and wherein, for a downlink channel on the SCell deployed with FDD or full-DL TDD configuration, if a downlink channel transmission is indicated by a detection of a corresponding downlink control channel or if a downlink control channel indicates a downlink Semi-Persistence Scheduling (SPS) release within subframe n-k, where k∈K and K, wherein K is a set of M elements $\{k_0, k_1, \ldots k_{(M-1)}\}$, and depending on the subframe n, the UE is further configured to select a HARQ timing sequence configuration for use on the PCell indicated by a PCell SIB1 TDD timing sequence configuration.

14. A method for selecting a suitable acknowledgement timing configuration in a time division duplex frequency division duplex (TDD-FDD) carrier aggregation (CA) enabled wireless communication network, comprising:
  associating, by a user equipment (UE), with a primary serving cell (PCell) and a secondary serving cell (SCell) of an enhanced-Node B (eNB), the PCell having a first TDD or first FDD configuration, the SCell having a second FDD or second TDD configuration, such that only one of the PCell and the SCell have a TDD configuration and only one of the PCell and the SCell have a FDD configuration, such that the PCell and the SCell include both of the TDD configuration and the FDD configuration;
  receiving, by the UE, downlink data through the PCell and SCell;
  categorizing a type of downlink data subframe in use by the SCell;
  selecting, by the UE, a hybrid automatic repeat request (HARQ) timing sequence configuration for use by the SCell based on the type of downlink data subframe;
  select a hybrid automatic repeat request (HARQ) timing sequence configuration for use on the PCell based on a PCell TDD uplink-downlink timing sequence configuration indicated in a received first system information block (SIB1) when the PCell is TDD configured;
  select a hybrid automatic repeat request (HARQ) timing sequence configuration for use on the PCell based on a FDD HARQ timing sequence configuration when the PCell is FDD configured; and
  transmitting acknowledgement information associated with the downlink data according to the selected hybrid automatic repeat request (HARQ) timing sequence configuration on the PCell, wherein the HARQ timing sequence configuration for use on the SCell for DL subframe n-k, where k>=4, is transmitted in a first available uplink data subframe n on the PCell, wherein appropriate values for k are determined irrespective of a type of downlink data subframe in use on the SCell.

15. The method of claim 14, wherein the hybrid automatic repeat request (HARQ) timing sequence configuration is selected for the PCell as follows:
   a PCell TDD uplink-downlink timing sequence configuration indicated in a first system information block (SIB1) configuration when PCell is TDD; or
   a FDD HARQ timing sequence configuration when PCell is FDD.

16. The method of claim 14, wherein a type of downlink data subframe in use by the SCell is a first type downlink data subframe or a second type downlink data subframe;
   wherein the first type downlink data subframe comprises a subframe that is a downlink data subframe on both the PCell and the SCell, or that is a downlink data subframe on both a scheduling cell and a scheduled cell in a case of a cross-carrier scheduling configuration, and wherein more than one TDD serving cell is configured and the configured scheduling cell is not the PCell; and/or
   wherein the second type of downlink data subframe comprises a subframe that is downlink only on the SCell;
   wherein if a UE is configured for use with more than one serving cell and if at least one of the more than one serving cell is deployed with a TDD uplink-downlink (UL-DL) configuration, and other ones of the more than one serving cell are deployed with a different full-downlink (full-DL) TDD configuration or FDD configuration, and wherein if a serving cell deployed with a TDD UL/DL configuration is set as the PCell, then the HARQ timing sequence configurations set for use with the PCell and SCell, respectively, are defined as follows:
   wherein, for a downlink channel on the SCell deployed with FDD or full-DL TDD configuration, if a downlink channel transmission is indicated by the detection of a corresponding downlink control channel or if a downlink control channel indicates a downlink Semi-Persistence Scheduling (SPS) release within subframe n-k, where k∈K and K, wherein K is a set of M elements $\{k_0, k_1, \ldots k_{(M-1)}\}$, depending on the subframe n, wherein a UL/DL timing sequence configuration for use on the PCell is defined as follows:
   c) if the downlink data subframe is a first type of downlink data subframe, then the HARQ timing sequence configuration used should follow a PCell SIB1 TDD timing sequence configuration regardless of cross-carrier scheduling or self-scheduling configuration, or alternatively follow a DL-reference UL/DL timing sequence configuration, wherein the DL-reference UL/DL configuration is jointly determined by a scheduling cell SIB1 TDD configuration and a PCell SIB1 timing sequence configuration in case of cross-carrier scheduling;
   d) if the downlink data subframe is a second type of downlink data subframe, the HARQ timing sequence configuration for use is defined by the following different alternatives:
      i) the HARQ timing sequence configuration for DL data transmission in subframe n-k, where k>=4, comprises transmitting a HARQ in a first available UL subframe n on PCell;
      ii) the HARQ timing sequence configuration for DL data transmission in subframe n-k, where k>=4, comprises transmitting a HARQ in an available UL subframe n on PCell in a distributed fashion across available UL subframes.

17. The method of claim 14, wherein, for a downlink channel on the SCell, if the SCell is deployed with FDD or full-DL TDD configuration, a downlink channel transmission is indicated by the detection of a corresponding downlink control channel or if a downlink control channel indicates a downlink SPS release within subframe n-k, where k∈K and K is a set of M elements $\{k_0, k_1, \ldots k_{(M-1)}\}$ depending on the subframe n; or
   wherein, for a downlink channel on the SCell, the HARQ timing sequence configuration used follows one DL-reference UL/DL configuration depending on the DL-to-UL switch-point periodicity of a UL/DL configuration in use on the PCell.

18. The method of claim 14, including a non-transitory machine readable medium comprising a plurality of instructions that, in response to being executed on a computing device, cause the computing device to carry out the method according claim 14.

* * * * *